United States Patent
Fang et al.

(10) Patent No.: US 12,120,542 B2
(45) Date of Patent: Oct. 15, 2024

(54) INFORMATION ACQUISITION METHOD, APPARATUS AND DEVICE, AND COMPUTER STORAGE MEDIUM

(71) Applicant: ZTE CORPORATION, Guangdong (CN)

(72) Inventors: Jianmin Fang, Shenzhen (CN); Xiaojuan Shi, Shenzhen (CN); He Huang, Shenzhen (CN); Jing Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 139 days.

(21) Appl. No.: 17/088,861

(22) Filed: Nov. 4, 2020

(65) Prior Publication Data
US 2021/0092629 A1    Mar. 25, 2021

Related U.S. Application Data

(63) Continuation of application No. PCT/CN2019/085871, filed on May 7, 2019.

(30) Foreign Application Priority Data

May 9, 2018    (CN) .......................... 201810438216.4

(51) Int. Cl.
*H04W 24/10*    (2009.01)
*H04L 5/00*    (2006.01)
(Continued)

(52) U.S. Cl.
CPC .......... *H04W 24/10* (2013.01); *H04W 48/08* (2013.01)

(58) Field of Classification Search
None
See application file for complete search history.

(56) References Cited

U.S. PATENT DOCUMENTS

2010/0075681 A1*  3/2010  Olofsson ............... H04W 16/24
                                              455/436
2012/0329461 A1* 12/2012  Teyeb ................... H04W 36/08
                                              455/437
(Continued)

FOREIGN PATENT DOCUMENTS

CN    101489210 A    7/2009
CN    104956722 A    9/2015
(Continued)

OTHER PUBLICATIONS

3GPP TSG-RAN WG2 #101Bis (R2-1806153), Sanya, P.R.China (Year: 2018).*

(Continued)

*Primary Examiner* — Jeffrey M Rutkowski
*Assistant Examiner* — Ning Li
(74) *Attorney, Agent, or Firm* — Foley & Lardner LLP

(57) ABSTRACT

Provided are a method, device and apparatus for acquiring information, and a computer storage medium. In the method for acquiring information, a first node receives a message transmitted by a second node, where the message is related to a cell group of the second node, each cell group includes one or more cells, and each cell belongs to a same wideband carrier. The first node acquires information on a cell under the second node from the message, that is, information on a cell in the each cell group. A device and an apparatus for acquiring information, and a storage medium are further provided.

8 Claims, 6 Drawing Sheets

An eNB1 receives a first message transmitted by a gNB3    S301

The eNB1 acquires information on a cell under the gNB3 from the first message    S302

(51) Int. Cl.
*H04W 16/10* (2009.01)
*H04W 16/24* (2009.01)
*H04W 48/08* (2009.01)
*H04W 48/12* (2009.01)
*H04W 72/0453* (2023.01)
*H04W 72/27* (2023.01)
*H04W 92/20* (2009.01)

(56) References Cited

U.S. PATENT DOCUMENTS

| | | | |
|---|---|---|---|
| 2014/0308955 A1 | 10/2014 | Won et al. | |
| 2014/0308959 A1* | 10/2014 | De Benedittis | H04W 36/0061 455/437 |
| 2015/0326371 A1* | 11/2015 | Baek | H04L 5/0058 455/450 |
| 2016/0316467 A1* | 10/2016 | Won | H04W 24/08 |
| 2017/0359737 A1 | 12/2017 | Singh et al. | |
| 2018/0103429 A1* | 4/2018 | Chou | H04W 52/0229 |
| 2018/0213454 A1* | 7/2018 | Santhanam | H04W 36/0033 |
| 2018/0255496 A1* | 9/2018 | Kim | H04W 76/27 |
| 2019/0150221 A1* | 5/2019 | Tseng | H04W 76/27 370/331 |
| 2020/0169926 A1* | 5/2020 | Hwang | H04W 80/08 |
| 2021/0153083 A1* | 5/2021 | Moosavi | H04W 36/0061 |
| 2021/0243624 A1* | 8/2021 | Moosavi | H04W 24/08 |
| 2021/0266802 A1* | 8/2021 | Arshad | H04W 36/00 |

FOREIGN PATENT DOCUMENTS

| | | |
|---|---|---|
| CN | 106304218 A | 1/2017 |
| CN | 107872851 A | 4/2018 |
| RU | 2548674 C2 | 4/2015 |
| WO | WO-2015/113289 A1 | 8/2015 |
| WO | WO-2016/180157 A1 | 11/2016 |

OTHER PUBLICATIONS

First Office Action for CN Appl. No. 2020116163273, dated Dec. 6, 2021 (with English translation, 11 pages).

International Search Report and Written Opinion for PCT Appl. No. PCT/CN2019/085871 mailed Aug. 1, 2019 (with English translation, 8 pages).

OPPO: "Left issues for Inactive security framework" 3GPP TSG-RAN2#101bis R2-1804551, May 20, 2018 (May 20, 2018), Sanya, China (8 pages).

Ericsson et al: "Inter-node coordination for ANR in EN-DC", 3GPP Draft; R2-1817304, Spokane, WA, Nov. 12, 2018 (5 pages).

Extended European Search Report on EP 19799453.6 dated Jul. 16, 2021 (13 pages).

First RU Office Action on RU 2020140385 dated Jul. 14, 2021 (with English translation, 10 pages).

VIVO: "Remaining issue for ANR", 3GPP Draft; R2-1809859, Montreal, Canada, Jun. 22, 2018 (3 pages).

VIVO: "Report of email discussion [101bi s#47] [NR] ANR", 3GPP Draft; R2-1807626, Busan, Korea, May 11, 2018 (19 pages).

Ericsson, "ANR framework for EN-DC and NR standalone", 3GPP TSG RAN WG2 #101bis R2-1806153, Apr. 6, 2018 (4 pages).

First Office Action on JP 2020-562615 dated Dec. 10, 2021 (6 pages).

* cited by examiner

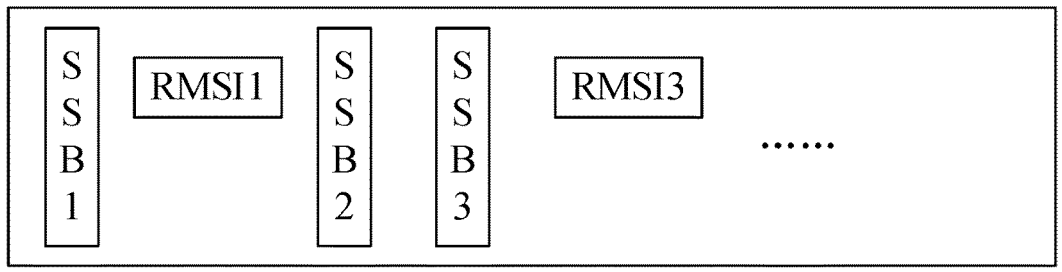

FIG. 1

```
┌─────────────────────────────────────────────────────────────────┐
│ A first node receives a first message transmitted by a second   │ S101
│ node, where the first message is related to a cell group of the │
│ second node, and cells in each cell group each belong to a same │
│ wideband carrier                                                │
└─────────────────────────────────────────────────────────────────┘
                              │
                              ▼
┌─────────────────────────────────────────────────────────────────┐
│ The first node acquires information on a cell under the second  │ S102
│ node from the first message                                     │
└─────────────────────────────────────────────────────────────────┘
```

FIG. 2

```
┌─────────────────────────────────────────────────────────────────┐ S201
│ A gNB1 receives a first message transmitted by a gNB2           │
└─────────────────────────────────────────────────────────────────┘
                              │
                              ▼
┌─────────────────────────────────────────────────────────────────┐ S202
│ The gNB1 acquires information on a cell under the gNB2 from the │
│ first message                                                   │
└─────────────────────────────────────────────────────────────────┘
```

FIG. 3

```
┌─────────────────────────────────────────────────────────────────┐ S301
│ An eNB1 receives a first message transmitted by a gNB3          │
└─────────────────────────────────────────────────────────────────┘
                              │
                              ▼
┌─────────────────────────────────────────────────────────────────┐ S302
│ The eNB1 acquires information on a cell under the gNB3 from the │
│ first message                                                   │
└─────────────────────────────────────────────────────────────────┘
```

FIG. 4

INFORMATION ACQUISITION METHOD, APPARATUS AND DEVICE, AND COMPUTER STORAGE MEDIUM

CROSS-REFERENCE TO RELATED APPLICATIONS

The present application claims the benefit of priority under 35 U.S.C. § 120 as a continuation of PCT Patent Application No. PCT/CN2019/085871, filed on May 7, 2019, which claims priority to Chinese patent application No. 201810438216.4 filed on May 9, 2018, the disclosure of each of which is incorporated herein by reference in its entirety.

TECHNICAL FIELD

The present application relates to the field of communication, and for example, to a method, device and apparatus for acquiring information and a computer storage medium.

BACKGROUND

With the continuous development of communication technologies, a fifth-generation (5G) mobile communication technology has emerged. In the 5G system, a new carrier type is introduced to improve a throughput rate of a radio access network (RAN) and utilization of radio resources. However, how a communication node acquires cell information for the new carrier type has not been solved.

SUMMARY

A main object of the present application is to provide a method, device and apparatus for acquiring information and a computer storage medium.

In one embodiment of the present disclosure, a method for acquiring information is provided, and the method includes steps described below. A first node receives a first message transmitted by a second node, where the first message is related to a cell group of the second node, and each cell in the cell group belongs to a same wideband carrier. The first node acquires information on a cell under the second node from the first message.

In one embodiment of the present disclosure, a method for acquiring information is provided, and the method includes a step described below. A first node receives a first message transmitted by a second node, where the first message carries information on one or more cells under the second node, and information on each cell of the cells includes a cell identifier and a wideband carrier identifier of a wideband carrier to which a cell belongs; or information on each cell includes the cell identifier and information of whether the cell belongs to the wideband carrier; and the information on each cell further includes at least one of: a physical cell identifier (PCI), frequency point information, a bandwidth, information of whether the cell includes a synchronization signal and physical broadcast channel block (SSB), an indication of whether the SSB is associated with remaining minimum system information (RMSI), information of whether the SSB is on a synchronization signal raster, or a cell role indication.

In one embodiment of the present disclosure, a method for acquiring information is provided, and the method includes steps described below. A first node receives a second message transmitted by a second node, where the second message carries a cell identifier and at least one of: a PCI, or frequency point information. The first node acquires information on a cell under the second node from the second message. When the first node determines that the information on the cell under the second node dose not satisfy an adoption condition, the first node transmits a third message to the second node, where the third message carries at least one of: a reason for not satisfying the adoption condition, or a recommended cell list.

In one embodiment of the present disclosure, an apparatus for acquiring information is provided, and the apparatus includes a processor and a memory coupled to the processor. The memory stores programs for acquiring information and executed on the processor, and when executed by the processor, the programs for acquiring information implement steps of the above-mentioned method for acquiring information.

In one embodiment of the present disclosure, a computer storage medium is provided, which is configured to store programs for acquiring information, when executed by a processor, the programs implement steps of the above-mentioned method for acquiring identifying information.

In the embodiment of the present disclosure, the first node receives the first message related to cell group of the second node and transmitted by the second node, where the each cell group includes one or more cells, and each cell belongs to the same wideband carrier. The first node acquires the information on the cell under the second node from the first message, that is, the information on the cell in the each cell group. Through the above-mentioned solution, the first node may acquire the information on the cell, which targets for the wideband carrier, under the second node, such that the improvement of a throughput rate of a radio access network (RAN) and the utilization of radio resources can be ensured after the wideband carrier is introduced.

BRIEF DESCRIPTION OF DRAWINGS

To illustrate solutions in embodiments of the present disclosure more clearly, the drawings used in description of the embodiments or of the related art will be briefly described below.

Apparently, the drawings described below are merely part of the embodiments of the present disclosure, and those of ordinary skill in the art may acquire other drawings based on the drawings described below on the premise that no creative work is done.

FIG. 1 is a schematic diagram showing a wideband carrier according to an embodiment of the present disclosure;

FIG. 2 is a flowchart of a method for acquiring information according to embodiment one of the present disclosure;

FIG. 3 is a flowchart of a method for acquiring information according to embodiment two of the present disclosure;

FIG. 4 is a flowchart of a method for acquiring information according to embodiment three of the present disclosure;

DETAILED DESCRIPTION

Figure 5:
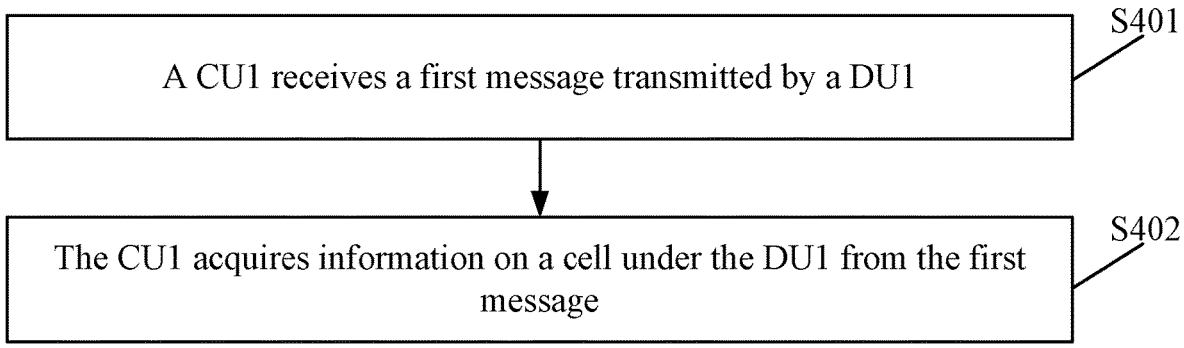
FIG. 5 is a flowchart of a method for acquiring information according to embodiment four of the present disclosure.

Solutions in embodiments of the present disclosure will be described clearly and completely in conjunction with the drawings in the embodiments of the present disclosure. Apparently, the embodiments described below are part, not all of the embodiments of the present application. On the basis of the embodiments of the present application, all other embodiments obtained by those skilled in the art are within the scope of the present application on the premise that no creative work is done.

In the 5G system, there are many different types of interfaces and cells, and some of interfaces and cells are described below.

Uu interface: a radio access network (RAN) includes a base station and a user equipment (UE), and an interface between the base station and the UE is the Uu interface.

Xn interface: in the 5G system, a 5G base station is called a new generation radio access network node (gNB), and an interface between gNBs is called the Xn interface.

NG interface: an interface between the gNB and a core network (CN) is called the NG interface.

F1 interface: the 5G base station may be divided into two parts, which are a central unit (CU) and a distributed unit (DU). One base station has one CU and one base station may have multiple DUs, which is called CU DU Split. An interface between the CU and the DU is called F1 interface.

Primary cell (Pcell) and secondary cell (Scell) under a carrier aggregation (CA) function: in the 5G system, the CA function is supported. Carrier aggregation is the aggregation of two or more component carriers (CC) to support a larger transmission bandwidth. The UE can simultaneously receive and transmit data on multiple CCs under the CA. The CC initially accessed by the UE is a primary component carrier (PCC), and other CCs are called secondary component carriers (SCCs). A serving cell corresponding to the PCC is called a primary cell, and a serving cell corresponding to the SCC is called a secondary cell.

Primary cell, primary secondary cell and secondary cell under dual connectivity (DC) and multiple connectivity (MC) functions: in the 5G system, the DC and MC functions are supported. The UE can maintain connection with two or more base stations at the same time under the dual connectivity or the multiple connectivity, one of the base station is called a master node (MN), and other base stations are called secondary nodes (SNs). A primary cell on the MN is called the primary cell, a primary cell on the SN is called a primary secondary cell, and secondary cells on the MN and the SN are both called secondary cells.

Standalone cell (SA cell) and non-standalone cell (NSA cell): in the 5G system, the SA cell refers to a cell which can be accessed by an idle-state UE, and the non-standalone cell refers to a cell which cannot be accessed by the idle-state UE but can be configured to a connected-state UE.

At the same time, some new carriers, such as a wideband carrier, are also introduced into the 5G system. FIG. 1 shows one wideband carrier, the one wideband carrier may have a plurality of synchronization signal and physical broadcast channel blocks (SSBs), and each SSB may be associated with a piece of remaining minimum system information (RMSI).

After the wideband carrier is introduced, a throughput rate of the RAN and the utilization of radio resources can be further improved. However, between communication nodes (for example, two base stations), the problem of acquiring information on a cell for the wideband carrier has not been solved. If the information on the cell for the wideband carrier can be acquired by using the communication nodes, the improvement of the throughput rate of the RAN and the utilization rate of the radio resources can be ensured.

Embodiment One

Embodiment one of the present disclosure provides a method for acquiring information, and the method can be applied to a first node. As shown in FIG. 2, the method includes steps described below.

In step S101, the first node receives a first message transmitted by a second node, where the first message is related to a cell group of the second node, and cells in each cell group each belong to a same wideband carrier.

In step S102, the first node acquires information on a cell under the second node from the first message.

The first node receives the first message related to the cell group of the second node and the first message is transmitted by the second node through the above-mentioned steps, and each cell belongs to the same wideband carrier. Subsequently, the first node acquires the information on the cell under the second node from the first message. Through the above-mentioned solution, the first node can acquire the information on the cell for the wideband carrier under the second node, such that the improvement of the throughput rate of the RAN and the utilization of radio resources may be ensured after the wideband carrier is introduced.

In step S101, the first node receives the first message transmitted by the second node. The first node may be a base station, and the base station may be an evolved node base station (eNB), or the base station may also be a gNB; or the first node may also be a CU or a DU. The second node may be a base station, and the base station may be a gNB; or the second node may be a DU or a CU.

The first message may be: an EN-DC X2 SETUP REQUEST, an EN-DC X2 SETUP RESPONSE, an EN-DC CONFIGURATION UPDATE, or an EN-DC CONFIGURATION UPDATE ACKNOWLEDGE of an EN-DC X2 interface. The first message may also be an XN SETUP REQUEST, an XN SETUP RESPONSE, an NG-RAN NODE CONFIGURATION UPDATE, or an NG-RAN NODE CONFIGURATION UPDATE ACKNOWLEDGE of an Xn interface. The first message may further be an F1 SETUP REQUEST, an F1 SETUP RESPONSE, an GNB-CU CONFIGURATION UPDATE, a GNB-CU CONFIGURATION UPDATE ACKNOWLEDGE, a GNB-DU CONFIGURATION UPDATE or a GNB-DU CONFIGURATION UPDATE ACKNOWLEDGE of an F1 interface. The first message may be other messages, for example, may be a new message.

In one case of embodiment one, the first node may be the eNB, the second node may be the gNB, an interface between the first node and the second node may be an EN-DC X2 interface, and the first message may be the EN-DC X2 SETUP REQUEST. In another case of embodiment one, the first node may be the CU, the second node may be the DU, the interface between the first node and the second node may be an F1 interface, and the first message may be the GNB-CU CONFIGURATION UPDATE.

In step S101, the first message is related to the cell group of the second node, the cell group may be one or more, each cell group may include one or more cells, and cells in each cell group belong to the same wideband carrier.

In one case of embodiment one, the first message carries information on one or more cells under the second node, and information on each cell includes a cell identifier, and information on one or more physical cells. Information on each physical cell includes at least one of: a physical cell identifier (PCI), frequency point information, a bandwidth, information of whether a physical cell includes a synchronization signal and physical broadcast channel block (SSB), an indication of whether the SSB is associated with remaining minimum system information (RMSI), information of whether the SSB is on a synchronization signal raster, or a cell role indication.

The information of whether the SSB is on the synchronization signal raster may include that the SSB is on the synchronization (on-sync) signal raster or the SSB is off the synchronization (off-sync) signal raster. The information of whether the physical cell includes the SSB, for example, may be expressed by whether SS block based RRM measurement timing configuration (SMTC) is included, the SSB is included if the SMTC is included; and the SSB is not included if the SMTC is not included. The above-mentioned information of whether the SSB is on the synchronization signal raster and information of whether the physical cell includes the SSB may be applied to other cases in embodiment one.

In one case of embodiment one, the first message carries the information on one or more cells under the second node, and the information on each cell of the cells includes the cell identifier, the information on one or more physical cells, and an indication of whether the cell belongs to the cell group. Information on each physical cell includes at least one of: the PCI, the frequency point information, the bandwidth, the information of whether the physical cell includes the SSB, the indication of whether the SSB is associated with the RMSI, the information of whether the SSB is on the synchronization signal raster, or the cell role indication.

In one case of embodiment one, the first message carries the information on one or more cells under the second node, and the information on each cell includes the cell identifier, and at least one of: the PCI, the frequency point information, the bandwidth, the information of whether the cell includes the SSB, the indication of whether the SSB is associated with the RMSI, the information of whether the SSB is on the synchronization signal raster, a cell group identifier of a cell group to which the cell belongs, an indication of whether the cell belongs to the cell group, or the cell role indication.

In one case of embodiment one, the first message carries the information on one or more cells under the second node, and the information on each cell includes the cell identifier, the cell group identifier of the cell group to which the cell belongs, and at least one of: the PCI, the frequency point information, the bandwidth, the information of whether the cell includes the SSB, the indication of whether the SSB is associated with the RMSI, the information of whether the SSB is on the synchronization signal raster, or the cell role indication.

In one case of embodiment one, the first message carries the information on one or more cells under the second node, and the information on each cell includes the cell identifier, the indication of whether the cell belongs to the cell group, and at least one of: the PCI, the frequency point information, the bandwidth, the information of whether the cell includes the SSB, the indication of whether the SSB is associated with the RMSI, the information of whether the SSB is on the synchronization signal raster, or the cell role indication.

In one case of embodiment one, the first message carries the information on one or more cells under the second node, the each cell includes the SSB, and the SSB is associated with the RMSI. Information on each cell includes the cell identifier, the cell group identifier of the cell group to which the cell belongs, and at least one of: the PCI, the frequency point information, the bandwidth, the information of whether the SSB is on the synchronization signal raster, or the cell role indication.

In one case of embodiment one, the first message carries the information on one or more cells under the second node, the each cell includes the SSB, and the SSB is not associated with the RMSI. Information on each cell includes the cell group identifier of the cell group to which the cell belongs, and at least one of: the PCI, the frequency point information, the bandwidth, the information of whether the SSB is on the synchronization signal raster, or the cell role indication.

In one case of embodiment one, the first message carries the information on one or more cells under the second node, the each cell does not include the SSB. Information on each cell includes the cell group identifier of the cell group to which the cell belongs, and at least one of: the PCI, the frequency point information, the bandwidth, or the cell role indication.

In one case of embodiment one, the first message carries information on one or more cell groups, each cell group includes the information on one or more cells under the second node, and the cell group identifier of the cell group. Each cell includes the SSB, and the SSB is associated with the RMSI. Information on each cell includes the cell identifier, and at least one of: the PCI, the frequency point information, the bandwidth, the information of whether the SSB is on the synchronization signal raster, or the cell role indication.

In one case of embodiment one, the first message carries information on one or more cell groups, and information on each cell group includes the information on one or more cells under the second cell, and the cell group identifier of the cell group. Each cell includes the SSB, and the SSB is not associated with the RMSI. Information on each cell includes at least one of: the PCI, the frequency point information, the bandwidth, the information of whether the SSB is on the synchronization signal raster, or the cell role indication.

In one case of embodiment one, the first message carries information on one or more cell groups, and information on each cell group includes the information on one or more cells under the second cell, and the cell group identifier of the cell group. Each cell does not include the SSB. Information on each cell includes at least one of: the PCI, the frequency point information, the bandwidth, or the cell role indication.

In one case of embodiment one, different combinations may be made in the case of embodiment one described above, that is, the first message may carry the information on the cell or may also carry the information on the cell group at the same time, or, of course, only carry the information on the cell or the information on the cell group. Information on each cell may be the same or different, or part of the information on the cell may be the same and part of the information on the cell may be different (the information on the cell in the case of the embodiment one described above may be combined differently). Information on each cell group may be the same or different, or part of the information on the cell group may be the same and part of the information on the cell group may be different (the information on the cell group in the case of the embodiment one described above may be combined differently).

In one case of embodiment one, the first message carries information on thirteen cells under the second node and information on two cell groups. In the information on thirteen cells, information on five cells includes the cell identifier, and the information on one or more physical cells; information on six cells includes the cell identifier, the information on one or more physical cells, and the indication of whether the cell belongs to the cell group; and information on two cells includes the cell identifier, the cell group identifier of the cell group to which the cell belongs, the PCI, the frequency point information, and the bandwidth. In the information on two cell groups, information on one cell group includes information on seven cells under the second node, and the cell group identifier of the cell group. The seven groups each include the SSB, and the SSB is not associated with the RMSI. The information on each of the seven cells includes the PCI, the frequency point information, and the bandwidth. Information on another one cell group includes information on five cells under the second node, and the cell group identifier of the cell group, where the five cells do not include the SSB. Information on each of the five cells includes the PCI, the frequency point information, the bandwidth and the cell role indication.

In one case of embodiment one, the above-mentioned cell identifier includes an NR cell global identifier (NCGI), and NR refers to the new radio access.

In one case of embodiment one, when a cell under the second node is a frequency division duplex (FDD) serving cell, the frequency point information includes an uplink new radio access absolute radio frequency channel number (NR-ARFCN) and a downlink NR-ARFCN. When the cell under the second node is an FDD neighbor cell, the frequency point information includes the downlink NR-ARFCN. When the cell under the second node is a time division duplex (TDD) serving cell or a TDD neighbor cell, the frequency point information includes an NR-ARFCN. It is to be noted that since no distinction is made between uplink and downlink of the NR-ARFCN in a TDD system, the frequency point information includes the NR-ARFCN. Therefore, the above-mentioned uplink NR-ARFCN, downlink NR-ARFCN, and NR-ARFCN are three different concepts.

In one case of embodiment one, when the cell under the second node includes the SSB, the downlink NR-ARFCN includes a center frequency point of the SSB or a global synchronization channel number (GSCN); or the uplink NR-ARFCN or the downlink NR-ARFCN includes an absolute frequency position of a reference point A of a wideband carrier to which the cell belongs. When the cell under the second node does not include the SSB, the uplink NR-ARFCN or the downlink NR-ARFCN includes the absolute frequency position of the reference point A of the wideband carrier to which the cell belongs.

In one case of embodiment one, when the cell under the second node includes the SSB, the NR-ARFCN includes the center frequency point of the SSB or the GSCN; or the NR-ARFCN includes the absolute frequency position of the reference point A of the wideband carrier to which the cell belongs. When the cell under the second node does not include the SSB, the NR-ARFCN includes the absolute frequency position of the reference point A of the wideband carrier to which the cell belongs.

In one case of embodiment one, the cell group identifier includes a frequency point of a wideband carrier to which a cell in the cell group belongs, an absolute frequency position of a reference point A of a wideband carrier to which the cell in the cell group belongs or a nonnegative integer.

In one case of embodiment one, the cell role indication includes at least one of: an indication of whether the cell under the second node servers as an SA cell, an indication of whether the cell under the second node only serves as an NSA cell, an indication of whether the cell under the second node serves as a Pcell, an indication of whether the cell under the second node serves as a Pscell, or an indication of whether the cell under the second node only serves as an Scell.

In step S102, the first node acquires information on the cell under the second node from the first message. Information on the cell acquired by the first node is determined according to the information on the cell carried by the first message, and different information on the cell carried by the first message will lead to different information on the cell acquired by the first node. If the first message carries information on one cell, the first node can acquire information on one cell; and if the first message carries information on a plurality of cells, the first node may acquire information on corresponding plurality of cells.

In one case of embodiment one, the first message carries the information on one or more cells under the second node, and the information on each cell includes the cell identifier, the indication of whether the cell belongs to the cell group, the PCI, the frequency point information, the information of whether the cell includes the SSB, the indication of whether the SSB is associated with the RMSI, and the information of whether the SSB is on the synchronization signal raster. At this time, the information on the cell acquired by the first node includes the cell identifier, the indication of whether the cell belongs to the cell group, the PCI, the frequency point information, the information of whether the cell includes the SSB, the indication of whether the SSB is associated with the RMSI, and the information of whether the SSB is on the synchronization signal raster.

After step S101, the first node may determine a type of the cell according to the information on the cell.

In one case of embodiment one, the information on the cell acquired by the first node includes the cell identifier, the indication of whether the cell belongs to the cell group, the PCI, the frequency point information, the information of whether the cell includes the SSB, the indication of whether the SSB is associated with the RMSI, and the information of whether the SSB is on the synchronization signal raster. The indication of whether the cell belongs to the cell group is that the cell belongs to the cell group, the information of whether the cell includes SSB is that the cell includes SSB, the indication of whether the SSB is associated with RMSI is that the SSB is associated with RMSI, and the information of whether the SSB is on the synchronization signal raster is that the SSB is on the synchronization signal raster. At this time, the first node can determine that the cell may serve as the SA cell.

Embodiment Two

Embodiment two of the present disclosure provides a method for acquiring information, and the method can be applied to a gNB. As shown in FIG. 3, the method includes steps described below.

In step 201, a gNB1 receives a first message transmitted by a gNB2.

The first message may be an XN SETUP REQUEST, an XN SETUP RESPONSE, an NG-RAN NODE CONFIGURATION UPDATE, or an NG-RAN NODE CONFIGURATION UPDATE ACKNOWLEDGE of an Xn interface.

The first message is related to a cell group of the gNB2, the cell group may be one or more, each cell group may include one or more cells, and cells in each cell group belong to a same wideband carrier.

The first message carries information on one or more cells under the gNB2, and information on each cell includes an NCGI and information on one or more physical cells. Information on each physical cell includes a PCI, frequency point information, a bandwidth, information of whether the physical cell includes an SSB (for example, may be expressed by whether SMTC is included, the SSB is included if the SMTC is included; and the SSB is not included if the SMTC is not included), an indication of whether the SSB is associated with RMSI, and information of whether the SSB is on a synchronization signal raster.

In step S202, the gNB1 acquires information on the cell under the gNB2 from the first message.

Information on the cell acquired by the gNB1 is the NCGI and the information on one or more physical cells. The information on each physical cell includes the PCI, the frequency point information, the bandwidth, the information of whether the physical cell includes the SSB, the indication of whether the SSB is associated with the RMSI, and the information of whether the SSB is on the synchronization signal raster.

After step S202, the gNB1 determines a type of a physical cell subordinate to the cell according to the acquired information on the cell.

In one case of embodiment two, the gNB1 acquires information on a cell, and the information on the cell includes the NCGI and information on a plurality of physical cells. At this time, the one case indicates that the cell belongs to the wideband carrier and includes the plurality of physical cells. The information on each physical cell includes the PCI, the frequency point information, the bandwidth, the information of whether the physical cell includes the SSB, the indication of whether the SSB is associated with the RMSI, and the information of whether the SSB is on the synchronization signal raster. When a terminal under the cell is in an idle state, if information on one of the plurality of physical cells includes that the physical cell includes the SSB, the SSB is associated with the RMSI, and the SSB is on the synchronization signal raster, then the physical cell can serve as the SA cell, otherwise the physical cell can only serve as the NSA cell. When the terminal under the cell is in a connected state, if the information on one of the plurality of physical cells includes that the physical cell includes the SSB, the SSB is associated with the RMSI, and the SSB is on the synchronization signal raster, the physical cell can serve as the Pcell; otherwise, if the physical cell includes the SSB, the physical cell can serve as the Pscell, and if the physical cell does not include the SSB, the physical cell can only serve as the Scell.

In one case of embodiment two, the gNB1 acquires the information on the cell, and the information on the cell includes the NCGI and information on one physical cell. At this time, the one case indicates that the cell belongs to a common carrier and includes one physical cell. It is to be noted that if the cell includes the plurality of physical cells, the information on the cell may include only the NCGI and the information on one physical cell (for example, the information on the cell carried in the first message includes only the NCGI and the information on one physical cell among the plurality of physical cells subordinate to the cell). In this case, the cell belongs to the wideband carrier. In order to avoid being unable to distinguish whether the cell belongs to the common carrier or the wideband carrier when the information on the cell includes the information on one physical cell, it is necessary to stipulate that when the cell includes the plurality of physical cells, the information on the cell carried by the first message must include the information on the plurality of physical cells, and can not only include the information on one physical cell. Under the stipulation, when the information on the cell includes the information on one physical cell, it indicates that the cell belongs to the common carrier and includes one physical cell.

Embodiment Three

Embodiment three of the present disclosure provides a method for acquiring information, and the method can be applied to an eNB. As shown in FIG. 4, the method includes steps described below.

In step 301, an eNB1 receives a first message transmitted by a gNB3.

The first message may be an EN-DC X2 SETUP REQUEST, an EN-DC X2 SETUP RESPONSE, an EN-DC CONFIGURATION UPDATE or an EN-DC CONFIGURATION UPDATE ACKNOWLEDGE of an EN-DC X2 interface.

The first message is related to a cell group of the gNB3, the cell group may be one or more, each cell group may include one or more cells, and cells in each cell group belong to a same wideband carrier.

The first message carries information on one or more cells under the gNB3, and information on each cell includes an NCGI, information on one or more physical cells, and an indication of whether the cell belongs to the cell group. Information on each physical cell includes a PCI, frequency point information, a bandwidth, information of whether the physical cell includes an SSB (for example, may be expressed by whether SMTC is included, the SSB is included if the SMTC is included; and the SSB is not included if the SMTC is not included), an indication of whether the SSB is associated with RMSI, and information of whether the SSB is on a synchronization signal raster.

In step S302, the gNB1 acquires information on the cell under the gNB3 from the first message.

The information on the cell acquired by the eNB1 is the NCGI, the information on one or more physical cells, and the indication of whether the cell belongs to the cell group. The information on each physical cell includes the PCI, the frequency point information, the bandwidth, the information of whether the physical cell includes the SSB, the indication of whether the SSB is associated with the RMSI, and the information of whether the SSB is on the synchronization signal raster.

After step S302, the eNB1 determines a type of a physical cell subordinate to the cell according to the acquired information on the cell.

In one case of embodiment three, the eNB1 acquires information on a cell, and the information on the cell includes the NCGI, the information on the plurality of physical cells, and the indication that the cell belongs to the cell group. At this time, the one case indicates that the cell belongs to the wideband carrier and includes the plurality of physical cells. The information on each physical cell includes the PCI, the frequency point information, the bandwidth, the information of whether the physical cell includes the SSB, the indication of whether the SSB is associated with the RMSI, and the information of whether the SSB is on the synchronization signal raster. When a terminal under the cell is in an idle state, if information on one of the plurality of physical cells includes that the physical cell includes the SSB, the SSB is associated with the RMSI, and the SSB is on the synchronization signal raster, then the physical cell can serve as the SA cell, otherwise the physical cell can only serve as the NSA cell. When the terminal under the cell is in a connected state, if the information on one of the plurality of physical cells includes that the physical cell includes the SSB, the SSB is associated with the RMSI, and the SSB is on the synchronization signal raster, the physical cell can serve as the Pcell; otherwise, if the physical cell includes the SSB, the physical cell can serve as the Pscell, and if the physical cell does not include the SSB, the physical cell can only serve as the Scell.

In one case of embodiment three, the eNB1 acquires information on a cell, and the information on the cell includes the NCGI, the information on one physical cell, and the indication that the cell does not belong to the cell group. At this time, the one case indicates that the cell belongs to a common carrier and includes one physical cell.

Embodiment Four

Embodiment four of the present disclosure provides a method for acquiring information, and the method can be applied to a CU. As shown in FIG. 5, the method includes steps described below.

In step 401, a CU1 receives a first message transmitted by a DU1.

The first message may be an F1 SETUP REQUEST, a GNB-DU CONFIGURATION UPDATE, and a GNB-CU CONFIGURATION UPDATE ACKNOWLEDGE of an F1 interface.

The first message is related to a cell group of the DU1, the cell group may be one or more, each cell group may include one or more cells, and cells in each cell group belong to a same wideband carrier.

The first message carries information on one or more cells under the DU1, and information on each cell includes an NCGI, an indication of whether the cell belongs to the cell group, a PCI, frequency point information, a bandwidth, information of whether the cell includes an SSB (for example, may be expressed by whether SMTC is included, the SSB is included if the SMTC is included; and the SSB is not included if the SMTC is not included), an indication of whether the SSB is associated with RMSI, and information of whether the SSB is on a synchronization signal raster.

In step S402, the CU1 acquires information on the cell(s) under the DU1 from the first message.

The information on a cell of the cell(s) acquired by the CU1 includes the NCGI, the indication of whether the cell belongs to the cell group, the PCI, the frequency point information, the bandwidth, the information of whether the cell includes the SSB, the indication of whether the SSB is associated with the RMSI, and the information of whether the SSB is on the synchronization signal raster.

After step S402, the CU1 determines a type of a cell according to the acquired information on the cell.

In one case of embodiment four, the CU1 acquires information on one cell, and the information on the cell includes the NCGI, and an indication that the cell belongs to the cell group. At this time, it indicates that the cell belongs to the wideband carrier. The information on the cell further includes the PCI, the frequency point information, the bandwidth, the information of whether the cell includes the SSB, the indication of whether the SSB is associated with the RMSI, and the information of whether the SSB is on the synchronization signal raster. When a terminal under the cell is in an idle state, if information on the cell includes that the cell includes the SSB, the SSB is associated with the RMSI, and the SSB is on the synchronization signal raster, then the cell can serve as the SA cell, otherwise the cell can only serve as the NSA cell. When the terminal under the cell is in a connected state, if the information on the cell includes that the cell includes the SSB, the SSB is associated with the RMSI, and the SSB is on the synchronization signal raster, the cell can serve as the Pcell; otherwise, if the cell includes the SSB, the cell can serve as the Pscell, and if the physical cell does not include the SSB, the cell can only serve as the Scell.

Embodiment Five

Figure 6:
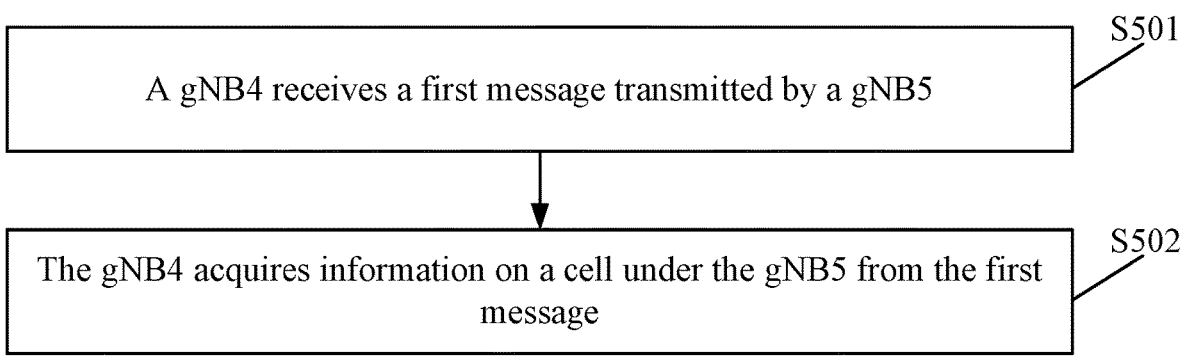
FIG. 6 is a flowchart of a method for acquiring information according to embodiment five of the present disclosure.

Embodiment five of the present disclosure provides a method for acquiring information, and the method can be applied to a gNB. As shown in FIG. 6, the method includes steps described below.

In step 501, a gNB4 receives a first message transmitted by a gNB5.

The first message may be an XN SETUP REQUEST, an XN SETUP RESPONSE, an NG-RAN NODE CONFIGURATION UPDATE, or an NG-RAN NODE CONFIGURATION UPDATE ACKNOWLEDGE of an Xn interface.

The first message is related to a cell group of the gNB5, the cell group may be one or more, each cell group may include one or more cells, and cells in each cell group belong to a same wideband carrier.

The first message carries information on one or more cells under the gNB5, and information on each cell includes an NCGI, a cell group identifier of a cell group to which the cell belongs, a PCI, frequency point information, a bandwidth, information of whether the cell includes an SSB (for example, may be expressed by whether SMTC is included, the SSB is included if the SMTC is included; and the SSB is not included if the SMTC is not included), an indication of whether the SSB is associated with RMSI, and information of whether the SSB is on a synchronization signal raster.

In step S502, the gNB4 acquires information on the cell under the gNB5 from the first message.

The information on the cell acquired by the gNB4 is the NCGI, the cell group identifier of the cell group to which the cell belongs, the PCI, the frequency point information, the bandwidth, the information of whether the cell includes the SSB, the indication of whether the SSB is associated with the RMSI, and the information of whether the SSB is on the synchronization signal raster.

After step S502, the gNB4 determines a type of the cell according to the acquired information on the cell.

In one case of embodiment five, the gNB4 acquires information on one cell, and the information on the cell includes the NCGI, and the cell group identifier of the cell group to which the cell belongs. At this time, it indicates that the cell belongs to the wideband carrier. The information on the cell further includes the PCI, the frequency point information, the bandwidth, the information of whether the cell includes the SSB, the indication of whether the SSB is associated with the RMSI, and the information of whether the SSB is on the synchronization signal raster. When a terminal under the cell is in an idle state, if information on the cell includes that the cell includes the SSB, the SSB is associated with the RMSI, and the SSB is on the synchronization signal raster, then the cell can serve as the SA cell, otherwise the cell can only serve as the NSA cell. When the terminal under the cell is in a connected state, if the information on the cell includes that the cell includes the SSB, the SSB is associated with the RMSI, and the SSB is on the synchronization signal raster, the cell can serve as the Pcell; otherwise, if the cell includes the SSB, the cell can serve as the Pscell, and if the physical cell does not include the SSB, the cell can only serve as the Scell.

Embodiment Six

Figure 7:
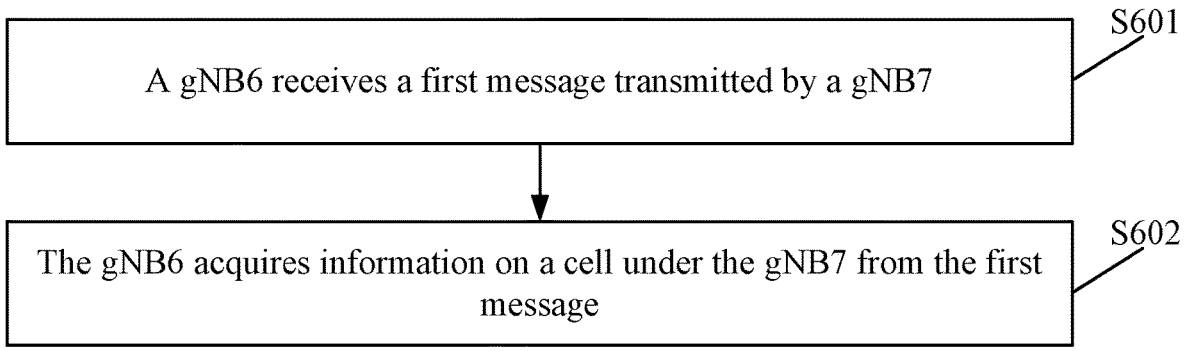
FIG. 7 is a flowchart of a method for acquiring information according to embodiment six of the present disclosure.

Embodiment six of the present disclosure provides a method for acquiring information, and the method can be applied to a gNB. As shown in FIG. 7, the method includes steps described below.

In step 601, a gNB6 receives a first message transmitted by a gNB7.

The first message may be an XN SETUP REQUEST, an XN SETUP RESPONSE, an NG-RAN NODE CONFIGURATION UPDATE, or an NG-RAN NODE CONFIGURATION UPDATE ACKNOWLEDGE of an Xn interface.

The first message is related to a cell group of the gNB7, the cell group may be one or more, each cell group may include one or more cells, and cells in each cell group belong to a same wideband carrier.

The first message carries information on one or more A-type cells under the gNB7, and each A-type cell includes the SSB, and the SSB is associated with the RMSI. Information on the each A-type cell includes an NCGI, a cell group identifier of a cell group to which the cell belongs, a PCI, frequency point information, a bandwidth, and information of whether the SSB of the cell is on the synchronization signal raster.

The first message further carries information on one or more B-type cells under the gNB7, each B-type cell includes the SSB, and the SSB is not associated with the RMSI; or the each B-type cell does not include the SSB. Information on the each B-type cell includes a cell group identifier of a cell group to which the cell belongs, whether the cell includes the SSB, the PCI, the frequency point information, the bandwidth, and a cell role indication.

In step S602, the gNB6 acquires information on the cell under the gNB7 from the first message.

The information on the cell acquired by the gNB6 is information on the A-type cell (includes the NCGI, the cell group identifier of the cell group to which the cell belongs, the PCI, the frequency point information, the bandwidth, and the information of whether the SSB is on the synchronization signal raster) and information on the B-type cell (includes the cell group identifier of the cell group to which the cell belongs, whether the cell includes the SSB, the PCI, the frequency point information, the bandwidth, and the cell role indication).

After step S602, the gNB6 determines a type of the cell according to the acquired information on the cell.

In one case of embodiment six, the gNB6 acquires information on one A-type cell, and the information on the one A-type cell includes the NCGI, a cell group identifier of a cell group to which the one A-type cell belongs, the PCI, the frequency point information, the bandwidth, and information of whether an SSB of the one A-type cell is on the synchronization signal raster. At this time, it indicates that the one A-type cell belongs to the wideband carrier. If the information on the one A-type cell includes that the SSB of the one A-type cell is on the synchronization signal raster, the one A-type cell can serve as the SA cell; and if the information on the one A-type cell includes that the SSB of the one A-type cell is off the synchronization signal raster, the one A-type cell can only serve as the NSA cell. The gNB6 further acquires information on one B-type cell, and the information on the one B-type cell includes a cell group identifier of a cell group to which the one B-type cell belongs, the PCI, the frequency point information, the bandwidth, whether the one B-type cell includes the SSB, and the cell role indication. At this time, it indicates that the one B-type cell belongs to the wideband carrier. If the information on the one B-type cell includes that the B-type cell includes the SSB, it indicates that the SSB is not associated with the RMSI, and then the one B-type cell can serve as the Pscell; and if the information on the one B-type cell does not include the SSB, the one B-type cell can only serve as the Scell.

Embodiment Seven

Figure 8:
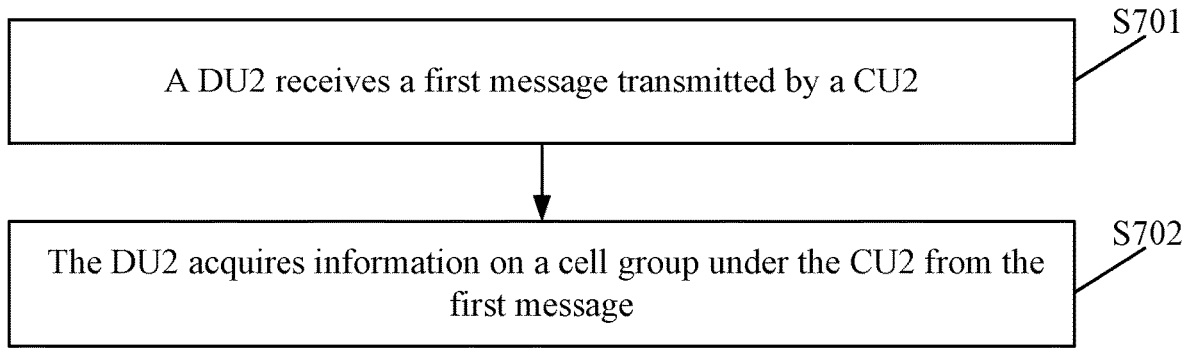
FIG. 8 is a flowchart of a method for acquiring information according to embodiment seven of the present disclosure.

Embodiment seven of the present disclosure provides a method for acquiring information, and the method can be applied to a DU. As shown in FIG. 8, the method includes steps described below.

In step 701, a DU2 receives a first message transmitted by a CU2.

The first message may be an F1 SETUP REQUEST, a GNB-CU CONFIGURATION UPDATE, and a GNB-CU CONFIGURATION UPDATE ACKNOWLEDGE of an F1 interface.

The first message is related to a cell group of the CU2, the cell group may be one or more, each cell group may include one or more cells, and cells in each cell group belong to a same wideband carrier.

The first message carries information on one or more cell groups under the CU2, information on each cell group includes information on one or more A-type cells under the CU2, information on one or more B-type cells under the CU2, and cell group identifiers of cell groups to which all cells belong.

Each A-type cell includes the SSB, and the SSB is associated with the RMSI. Information on the each A-type cell includes an NCGI, a PCI, frequency point information, a bandwidth, and information of whether the SSB of the cell is on the synchronization signal raster.

Each B-type cell includes the SSB, and the SSB is not associated with the RMSI; or the each B-type cell does not include the SSB. Information on the each B-type cell includes whether the cell includes the SSB, the PCI, the frequency point information, the bandwidth, and a cell role indication.

In step S702, the DU2 acquires information on the cell group under the CU2 from the first message.

The information on the cell group acquired by the DU2 is the information on one or more A-type cells under the CU2, information on one or more B-type cells under the CU2, and cell group identifiers of cell groups to which all cells belong.

After step S702, the DU2 determines a type of the cell according to the acquired information on the cell.

In one case of embodiment seven, the DU2 acquire a piece of information on the cell group, and the information on the cell group includes information on one A-type cell, information on one B-type cell, and cell group identifiers of cell groups to which all cells belong. At this time, it indicates that cells in the cell group belong to the wideband carrier. Information on the A-type cell includes the NCGI, the PCI, the frequency point information, the bandwidth, and the information of whether the SSB of the cell is on the synchronization signal raster. If the information on the cell includes that the SSB of the cell is on the synchronization signal raster, the cell can serve as the SA cell; and if the information on the cell includes that the SSB of the cell is off the synchronization signal raster, the cell can only serve as the NSA cell. Information on the B-type cell includes the PCI, the frequency point information, the bandwidth, whether the cell includes the SSB, and the cell role indication. If the information on the cell includes that the cell includes the SSB, it indicates that the SSB is not associated with the RMSI, and then the cell can serve as the Pscell; and if the information on the cell does not include the SSB, the cell can only serve as the Scell.

Embodiment Eight

Figure 9:
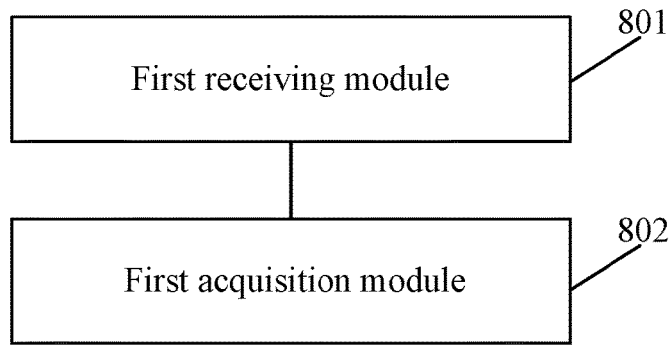
FIG. 9 is a structural block diagram of a device for acquiring information according to embodiment eight of the present disclosure.

Embodiment eight of the present disclosure provides a device for acquiring information, and the device can be applied to a first node. As shown in FIG. 9, the device includes a first receiving module 801 and a first acquisition module 802. The first receiving module 801 is used for the first node to receive a first message transmitted by a second node, where the first message is related to a cell group of the second node, and cells in each cell group belong to a same wideband carrier. The first acquisition module 802 is used for the first node to acquire information on a cell under the second node from the first message.

The first message carries information on one or more cells under the second node, and information on each cell includes a cell identifier and information on one or more physical cells; or the information on each cell includes the cell identifier, the information on one or more physical cells, and an indication of whether the cell belongs to the cell group. Information on each physical cell includes at least one of: a PCI, frequency point information, a bandwidth, information of whether a physical cell includes an SSB, an indication of whether the SSB is associated with RMSI, information of whether the SSB is on a synchronization signal raster, or a cell role indication.

The first message carries the information on one or more cells under the second node, and the information on each cell includes the cell identifier, and a cell group identifier of a cell group to which a cell belongs; or the information on each cell includes the cell identifier, and the indication of whether the cell belongs to the cell group. Information on each cell further includes at least one of: the PCI, the frequency point information, the bandwidth, the information of whether the cell includes the SSB (for example, may be expressed by whether SMTC is included, the SSB is included if the SMTC is included; and the SSB is not included if the SMTC is not included), the indication of whether the SSB is associated with the RMSI, information of whether the SSB is on the synchronization signal raster, or the cell role indication.

The first message carries the information on one or more cells under the second node, the each cell includes the SSB, and the SSB is associated with the RMSI. Information on each cell includes the cell identifier, the cell group identifier of the cell group to which the cell belongs, and at least one of: the PCI, the frequency point information, the bandwidth, the information of whether the SSB is on the synchronization signal raster, or the cell role indication.

The first message carries the information on one or more cells under the second node, the each cell includes the SSB, and the SSB is not associated with the RMSI. Information on each cell includes the cell group identifier of the cell group to which the cell belongs, and at least one of: the PCI, the frequency point information, the bandwidth, the information of whether the SSB is on the synchronization signal raster, or the cell role indication.

The first message carries the information on one or more cells under the second node, the each cell does not include the SSB. Information on each cell includes the cell group identifier of the cell group to which the cell belongs, and at least one of: the PCI, the frequency point information, the bandwidth, or the cell role indication.

The first message carries information on one or more cell groups, each cell group includes the information on one or more cells under the second node, and the cell group identifier of the cell group. Each cell includes the SSB, and the SSB is associated with the RMSI. Information on each cell includes the cell identifier, and at least one of: the PCI, the frequency point information, the bandwidth, the information of whether the SSB is on the synchronization signal raster, or the cell role indication.

The first message carries information on one or more cell groups, each cell group includes the information on one or more cells under the second node, and the cell group identifier of the cell group. Each cell includes the SSB, and the SSB is not associated with the RMSI. Information on each cell includes at least one of: the PCI, the frequency point information, the bandwidth, the information of whether the SSB is on the synchronization signal raster, or the cell role indication.

The first message carries information on one or more cell groups, and information on each cell group includes the information on one or more cells under the second node, and the cell group identifier of the cell group. Each cell does not include the SSB. Information on each cell includes at least one of: the PCI, the frequency point information, the bandwidth, or the cell role indication.

The cell identifier includes an NCGI.

When the cell under the second node is an FDD serving cell, the frequency point information includes an uplink NR-ARFCN and a downlink NR-ARFCN. When the cell under the second node is an FDD neighbor cell, the frequency point information includes a downlink NR-ARFCN.

When the cell under the second node is a TDD serving cell or a TDD neighbor cell, the frequency point information includes an NR-ARFCN.

When the cell under the second node includes the SSB, the downlink NR-ARFCN or the NR-ARFCN includes a center frequency point of the SSB or a global synchronization channel number (GSCN); or the uplink NR-ARFCN, the downlink NR-ARFCN or the NR-ARFCN includes an absolute frequency position of a reference point A of a wideband carrier to which the cell belongs. When the cell under the second node does not include the SSB, the uplink NR-ARFCN, the downlink NR-ARFCN or the NR-ARFCN includes the absolute frequency position of the reference point A of the wideband carrier to which the cell belongs.

The cell group identifier includes a frequency point of a wideband carrier to which the cell in the cell group belongs, an absolute frequency position of a reference point A of a wideband carrier to which the cell in the cell group belongs or a nonnegative integer.

The cell role indication includes at least one of: an indication of whether the cell under the second node servers as an SA cell, an indication of whether the cell under the second node only serves as an NSA cell, an indication of whether the cell under the second node serves as a Pcell, an indication of whether the cell under the second node serves as a Pscell, or an indication of whether the cell under the second node only serves as an Scell.

Embodiment Nine

Embodiment nine of the present disclosure provides an apparatus for acquiring information, and the apparatus includes a processor and a memory coupled to the processor. The memory stores programs for acquiring information and executed on the processor, and when executed by the processor, the programs for acquiring information implement steps described below.

In step S101, a first node receives a first message transmitted by a second node, where the first message is related to a cell group of the second node, and cells in each cell group belong to a same wideband carrier.

In step S102, the first node acquires information on a cell under the second node from the first message.

In one case of embodiment nine, steps in embodiments one to seven can also be implemented when the processor executes the programs.

Embodiment Ten

Embodiment ten provides a computer storage medium storing programs for acquiring information, and when the programs for acquiring information is executed by a processor, the following steps are implemented.

In step S101, a first node receives a first message transmitted by a second node, where the first message is related to a cell group of the second node, and cells in each cell group belong to a same wideband carrier.

In step S102, the first node acquires information on a cell under the second node from the first message.

In this embodiment, the above-mentioned storage medium may include, but is not limited to, a USB flash disk, a read-only memory (ROM), a random access memory (RAM), a mobile hard disk, a magnetic disk, an optical disk or another medium capable of storing program codes.

In one case of embodiment ten, steps in embodiments one to seven can also be implemented when the processor executes the programs.

Embodiment Eleven

Figure 10:
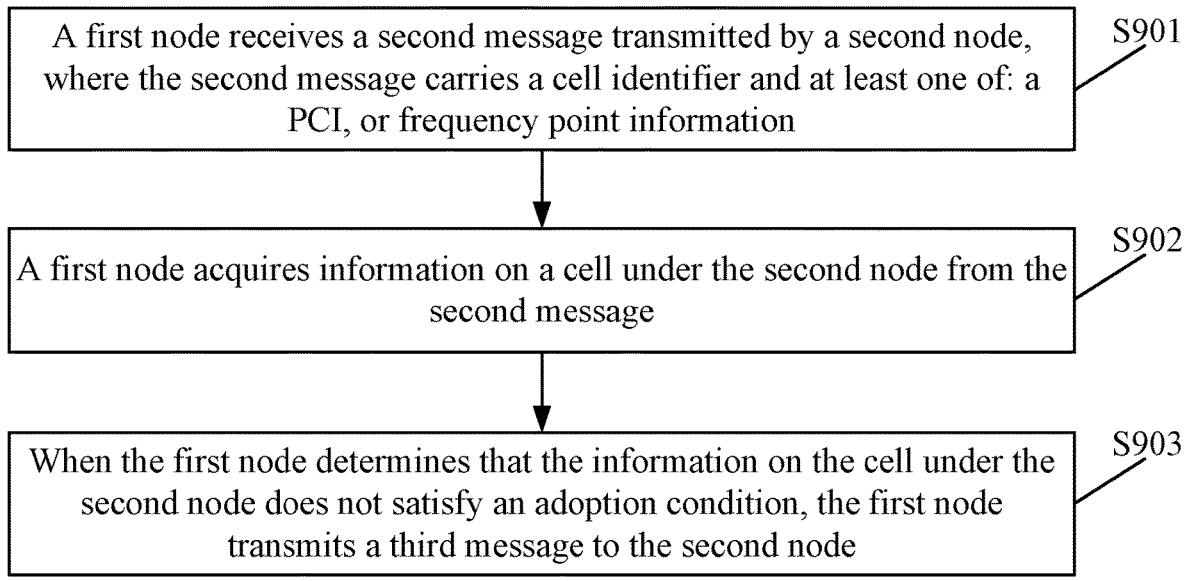
FIG. 10 is a flowchart of a method for acquiring information according to embodiment eleven of the present disclosure.

Embodiment eleven of the present disclosure provides a method for acquiring information, and the method can be applied to a first node. As shown in FIG. 10, the method includes steps described below.

In step S901, a first node receives a second message transmitted by a second node, where the second message carries a cell identifier and at least one of: a PCI, or frequency point information.

In step S902, the first node acquires information on a cell under the second node from the second message.

In step S903, when the first node determines that the information on the cell under the second node does not satisfy an adoption condition, the first node transmits a third message to the second node. The third message carries at least one of: a reason for not satisfying the adoption condition, or a recommended cell list.

Through the above-mentioned steps, the first node receives the second message, acquires the information on the cell under the second node from the second message, and transmits information such as the reason for not satisfying the adoption condition to the second node when it is determined that the information on the cell does not satisfy the adoption condition. Through the above-mentioned scheme, the second node can perform subsequent actions correctly.

In step S901, the first node receives the second message transmitted by the second node.

The first node may be a base station, the base station may be an eNB, or the base station may also be a gNB; or the first node may also be a CU or a DU. The second node may be a base station, and the base station may be a gNB; or the second node may be a DU or a CU.

The second message may be an SGNB ADDITION REQUEST or an SGNB MODIFICATION REQUEST of an EN-DC X2 interface. The second message may also be a HANDOVER REQUEST, an S-NODE ADDITION REQUEST or an S-NODE MODIFICATION REQUEST of an Xn interface. The second message may further be a UE CONTEXT SETUP REQUEST, a UE CONTEXT MODIFICATION REQUEST, or an INITIAL UL RRC MESSAGE TRANSFER of an F1 interface. The second message may be other messages, for example, may be a new message.

In one case of embodiment eleven, the first node may be the eNB, the second node may be the gNB, an interface between the first node and the second node may be an EN-DC X2 interface, and the first message may be the SGNB MODIFICATION REQUEST. In another case of embodiment eleven, the first node may be the CU, the second node may be the DU, the interface between the first node and the second node may be the F1 interface, and the first message may be the UE CONTEXT SETUP REQUEST.

The second message carries a cell identifier, a PCI, and frequency point information; or the second message carries the cell identifier and the PCI; or the second message carries the cell identifier and the frequency point information.

In one case of embodiment eleven, the above-mentioned cell identifier includes an NCGI.

In one case of embodiment eleven, when the cell under the second node is an FDD serving cell, the frequency point information includes an uplink NR-ARFCN and a downlink NR-ARFCN. When the cell under the second node is an FDD neighbor cell, the frequency point information includes the downlink NR-ARFCN. When the cell under the second node is a TDD serving cell or a TDD neighbor cell, the frequency point information includes an NR-ARFCN. It is to be noted that since no distinction is made between uplink and downlink of the NR-ARFCN in a TDD system, the frequency point information includes the NR-ARFCN. Therefore, the above-mentioned uplink NR-ARFCN, downlink NR-ARFCN, and NR-ARFCN are three different concepts.

In step S902, the first node acquires information on the cell under the second node from the second message.

The information on the cell under the second node may include the cell identifier, the PCI, and the frequency point information.

In step S903, when the first node determines that the information on the cell under the second node does not satisfy the adoption condition, the first node transmits the third message to the second node.

The first node determines that the information on the cell under the second node does not satisfy the adoption condition, which may include that the first node acquires an uplink initial bandwidth part (BWP) and a downlink initial BWP of the cell under the second node according to the PCI and the frequency point information; and the first node determines that the cell under the second node does not satisfy a load condition according to the uplink initial BWP and the downlink initial BWP.

The third message may be an SGNB ADDITION REQUEST REJECT or an SGNB MODIFICATION REQUEST REJECT of an EN-DC X2 interface. The third message may also be a HANDOVER PREPARATION FAILURE, an S-NODE ADDITION REQUEST REJECT or an S-NODE MODIFICATION REQUEST REJECT of an Xn interface. The third message may further be a UE CONTEXT SETUP FAILURE, a UE CONTEXT SETUP RESPONSE, a UE CONTEXT MODIFICATION FAILURE or a UE CONTEXT MODIFICATION RESPONSE of an F1 interface. The third message may be other messages, for example, may be a new message.

The third message carries the reason for not satisfying the adoption condition, and the reason for not satisfying the adoption condition includes a reason for an uplink initial BWP load, a reason for a downlink initial BWP load, or a reason for the uplink initial BWP load and the downlink initial BWP load.

The third message caries the recommended cell list, and the recommended cell list includes at least one of: a cell identifier of a cell satisfying the adoption condition, a PCI of the cell satisfying the adoption condition, or frequency point information of the cell satisfying the adoption condition.

After step S903, the method may further include a step described below. When the first node determines that the information on the cell under the second node satisfies the adoption condition, the first node acquires the uplink initial BWP and the downlink initial BWP on the cell under the second node according to the PCI and the frequency point information. An idle or inactive terminal under the first node monitors system information and paging information on the downlink initial BWP, and the terminal performs random access on the downlink initial BWP and the uplink initial BWP.

Embodiment Twelve

Figure 11:
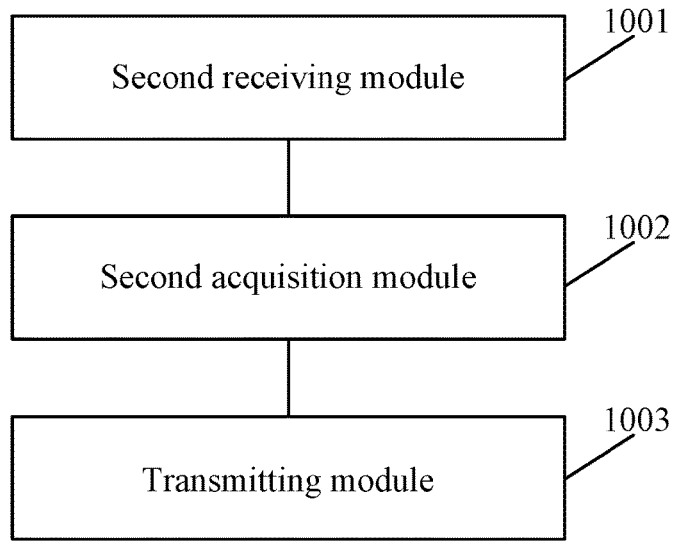
FIG. 11 is a structural block diagram of a device for acquiring information according to embodiment twelve of the present disclosure.

Embodiment twelve of the present disclosure provides a device for acquiring information, and the device can be applied to a first node. As shown in FIG. 11, the device includes a second receiving module 1001, a second acquisition module 1002, and a transmission module 1003. The second receiving module 1001 is used for the first node to receive a second message transmitted by a second node, where the second message carries a cell identifier, and at least one of: a PCI, or frequency point information. The second acquisition module 1002 is used for the first node to acquire information on a cell under the second node from the second message. When the first node determines that the information on the cell under the second node dose not satisfy an adoption condition, the first node transmits a third message to the second node, where the third message carries at least one of: a reason for not satisfying the adoption condition, or a recommended cell list.

The first node determines that the information on the cell under the second node does not satisfy the adoption condition, which includes that the first node acquires an uplink initial BWP and a downlink initial BWP of the cell under the second node according to the PCI and the frequency point information; and the first node determines that the cell under the second node does not satisfy a load condition according to the uplink initial BWP and the downlink initial BWP.

The reason for not satisfying the adoption condition includes at least one of: a reason for an uplink initial BWP load, a reason for a downlink initial BWP load, or a reason for the uplink initial BWP load and the downlink initial BWP load.

The recommended cell list includes at least one of: a cell identifier of a cell satisfying the adoption condition, a PCI of the cell satisfying the adoption condition, or frequency point information of the cell satisfying the adoption condition.

Embodiment Thirteen

Embodiment thirteen of the present disclosure provides an apparatus for acquiring information, and the apparatus includes a processor and a memory coupled to the processor. The memory stores programs for acquiring information and executed on the processor, and when executed by the processor, the programs for acquiring information implement steps described below.

In step S901, a first node receives a second message transmitted by a second node, where the second message carries a cell identifier and at least one of: a PCI, or frequency point information.

In step S902, the first node acquires information on a cell under the second node from the second message.

In step S903, when the first node determines that the information on the cell under the second node does not satisfy an adoption condition, the first node transmits a third message to the second node. The third message carries at least one of: a reason for not satisfying the adoption condition, or a recommended cell list.

In one case of embodiment thirteen, steps in embodiment eleven can further be implemented when the processor executes the programs.

Embodiment Fourteen

Embodiment fourteen provides a computer storage medium storing programs for acquiring information, and when the programs for acquiring information is executed by a processor, the following steps are implemented.

In step S901, a first node receives a second message transmitted by a second node, where the second message carries a cell identifier and at least one of: a PCI, or frequency point information.

In step S902, the first node acquires information on a cell under the second node from the second message.

In step S903, when the first node determines that the information on the cell under the second node does not satisfy an adoption condition, the first node transmits a third message to the second node. The third message carries at least one of: a reason for not satisfying the adoption condition, or a recommended cell list.

In this embodiment, the above-mentioned storage medium may include, but is not limited to, a USB flash disk, a read-only memory (ROM), a random access memory (RAM), a mobile hard disk, a magnetic disk, an optical disk or another medium capable of storing program codes.

In one case of embodiment fourteen, steps in embodiment eleven can further be implemented when the processor executes the programs.

Embodiment Fifteen

Figure 12:
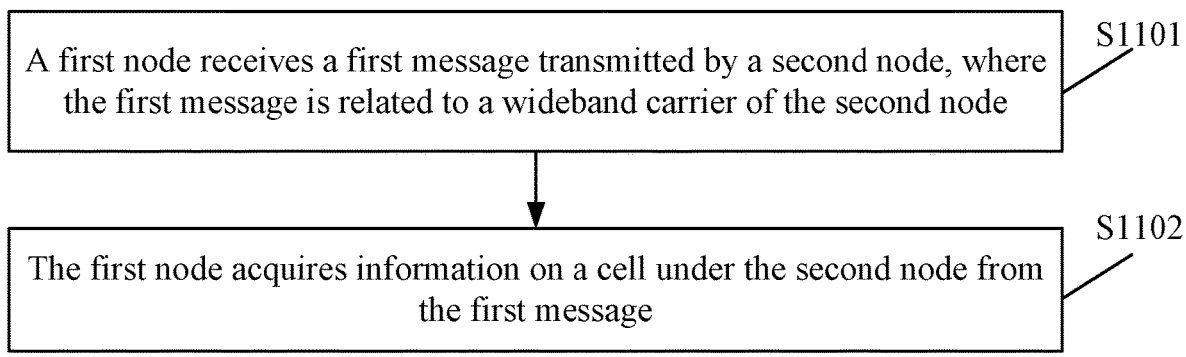
FIG. 12 is a flowchart of a method for acquiring information according to embodiment fifteen of the present disclosure.

Embodiment fifteen of the present disclosure provides a method for acquiring information, and the method can be applied to a first node. As shown in FIG. 12, the method includes steps described below.

In step S1101, a first node receives a first message transmitted by a second node, where the first message is related to a wideband carrier of the second node.

In step S1102, the first node acquires information on a cell under the second node from the first message.

Through the above-mentioned steps, the first node receives the first message related to the wideband carrier of the second node and transmitted by the second node, and subsequently, the first node acquires the information on the cell under the second node from the first message. Through the above-mentioned solution, the first node can acquire the information on the cell for the wideband carrier under the second node, such that the improvement of the throughput rate of the RAN and the utilization of radio resources can be ensured after the wideband carrier is introduced.

In step S1101, the first node receives the first message transmitted by the second node. The first node may be a base station, the base station may be an eNB, or the base station may also be a gNB; or the first node may also be a CU or a DU. The second node may be a base station, and the base station may be a gNB; or the second node may be a DU or a CU.

The first message may be an EN-DC X2 SETUP REQUEST, an EN-DC X2 SETUP RESPONSE, an EN-DC CONFIGURATION UPDATE or an EN-DC CONFIGURATION UPDATE ACKNOWLEDGE of an EN-DC X2 interface. The first message may also be an XN SETUP REQUEST, an XN SETUP RESPONSE, an NG-RAN NODE CONFIGURATION UPDATE, or an NG-RAN NODE CONFIGURATION UPDATE ACKNOWLEDGE of an Xn interface. The first message may further be an F1 SETUP REQUEST, a GNB-CU CONFIGURATION UPDATE, and a GNB-DU CONFIGURATION UPDATE ACKNOWLEDGE of an F1 interface. The first message may be other messages, for example, may be a new message.

In one case of embodiment fifteen, the first node may be the eNB, the second node may be the gNB, an interface between the first node and the second node may be an EN-DC X2 interface, and the first message may be the EN-DC X2 SETUP REQUEST. In another case of embodiment fifteen, the first node may be the CU, the second node may be the DU, the interface between the first node and the second node may be an F1 interface, and the first message may be the GNB-DU CONFIGURATION UPDATE.

In step S1101, the first message is related to the wideband carrier of the second node. One or more cells are included under the second node, and when multiple cells are included under the second node, the multiple cells may belong to a same wideband carrier, or may belong to different wideband carriers. For example, when ten cells are included under the second node, where three cells belong to one wideband carrier, and seven cells belong to the other wideband carrier.

In one case of embodiment fifteen, the first message carries information on one or more cells under the second node, and information on each cell includes a cell identifier, and information on one or more physical cells. Information on each physical cell includes at least one of: a PCI, frequency point information, a bandwidth, information of whether the physical cell includes an SSB, an indication of whether the SSB is associated with RMSI, the information of whether the SSB is on a synchronization signal raster, and a cell role indication.

The information of whether the SSB is on the synchronization signal raster may include that the SSB is on the synchronization signal raster or the SSB is off the synchronization signal raster. The information of whether the physical cell includes the SSB, for example, may be expressed by whether SMTC is included, the SSB is included if the SMTC is included; and the SSB is not included if the SMTC is not included. The above-mentioned information of whether the SSB is on the synchronization signal raster and information of whether the physical cell includes the SSB may be applied to other cases in embodiment one.

In one case of embodiment fifteen, the first message carries the information on one or more cells under the second node, and information on each cell includes the cell identifier, the information on one or more physical cells, and an indication of whether the cell belongs to the wideband carrier. Information on each physical cell includes at least one of: the PCI, the frequency point information, the bandwidth, the information of whether the physical cell includes the SSB, the indication of whether the SSB is associated with the RMSI, the information of whether the SSB is on the synchronization signal raster, or the cell role indication.

In one case of embodiment fifteen, the first message carries the information on one or more cells under the second node, and the information on each cell includes the cell identifier, and at least one of: the PCI, the frequency point information, the bandwidth, the information of whether the cell includes the SSB, the indication of whether the SSB is associated with the RMSI, the information of whether the SSB is on the synchronization signal raster, a wideband carrier identifier of a wideband carrier to which the cell belongs, information of whether the cell belongs to the wideband carrier, or the cell role indication.

In one case of embodiment fifteen, the first message carries the information on one or more cells under the second node, and the information on each cell includes the cell identifier, the wideband carrier identifier of the wideband carrier to which the cell belongs, and at least one of: the PCI, the frequency point information, the bandwidth, the information of whether the cell includes the SSB, the indication of whether the SSB is associated with the RMSI, the information of whether the SSB is on the synchronization signal raster, or the cell role indication.

In one case of embodiment fifteen, the first message carries the information on one or more cells under the second node, and the information on each cell includes the cell identifier, the indication of whether the cell belongs to the cell group, and at least one of: the PCI, the frequency point information, the bandwidth, the information of whether the cell includes the SSB, the indication of whether the SSB is associated with the RMSI, the information of whether the SSB is on the synchronization signal raster, or the cell role indication.

In one case of embodiment fifteen, the first message carries the information on one or more cells under the second node, the each cell includes the SSB, and the SSB is associated with the RMSI. Information on each cell includes the cell identifier, the wideband carrier identifier of the wideband carrier to which the cell belongs, and at least one of: the PCI, the frequency point information, the bandwidth, whether the SSB of the cell is on the synchronization signal raster, or the cell role indication.

In one case of embodiment fifteen, the first message carries the information on one or more cells under the second node, the each cell includes the SSB, and the SSB is not associated with the RMSI. Information on each cell includes the wideband carrier identifier of the wideband carrier to which the cell belongs, and at least one of: the PCI, the frequency point information, the bandwidth, whether the SSB of the cell is on the synchronization signal raster, or the cell role indication.

In one case of embodiment fifteen, the first message carries the information on one or more cells under the second node, the each cell does not include the SSB. Information on each cell includes the wideband carrier identifier of the wideband carrier to which the cell belongs, and at least one of: the PCI, the frequency point information, the bandwidth, or the cell role indication.

In one case of embodiment fifteen, the first message carries information on one or more wideband carriers, information on each wideband carrier includes information on one or more cells under the second cell, and the wideband carrier identifier of the wideband carrier to which the cell belongs. Each cell includes the SSB, and the SSB is associated with the RMSI. Information on each cell includes the cell identifier, and at least one of: the PCI, the frequency point information, the bandwidth, the information of whether the SSB is on the synchronization signal raster, or the cell role indication.

In one case of embodiment fifteen, the first message carries information on one or more wideband carriers, information on each wideband carrier includes information on one or more cells under the second cell, and wideband carrier identifiers of wideband carriers to which all cells belong. Each cell includes the SSB, and the SSB is not associated with the RMSI. Information on each cell includes at least one of: the PCI, the frequency point information, the bandwidth, the information of whether the SSB is on the synchronization signal raster, or the cell role indication.

In one case of embodiment fifteen, the first message carries information on one or more wideband carriers, information on each wideband carrier includes information on one or more cells under the second cell, and wideband carrier identifiers of wideband carriers to which all cells belong. Each cell does not include the SSB. Information on each cell includes at least one of: the PCI, the frequency point information, the bandwidth, or the cell role indication.

In one case of embodiment fifteen, different combinations may be made in the case of embodiment fifteen described above, that is, the first message may carry the information on the cell or may also carry the information on the wideband carrier at the same time, or, of course, only carry the information on the cell or the information on the wideband carrier. Information on each cell may be the same or different, or part of the information on the cell may be the same and part of the information on the cell may be different (the information on the cell in the case of the embodiment fifteen described above may be combined differently). Information on each wideband carrier may be the same or different, or part of the information on the cell group may be the same and part of the information on the cell group may be different (the information on the wideband carrier in the case of the embodiment fifteen described above may be combined differently).

In one case of embodiment fifteen, the first message carries information on thirteen cells under the second node and information on two wideband carriers. In the information on thirteen cells, information on five cells includes the cell identifier, the information on one or more physical cells; information on six cells includes the cell identifier, the information on one or more physical cells, and information of whether the cell belongs to the wideband carrier; and information on two cells includes the cell identifier, the wideband carrier identifier of the wideband carrier to which the cell belongs, the PCI, the frequency point information, and the bandwidth. In the information on two wideband carriers, information on one wideband carrier includes information on seven cells under the second node, and wideband carrier identifiers of wideband carriers to which the seven cells belong. The seven cells each include the SSB, and the SSB is not associated with the RMSI. Information on each of the seven cells includes the PCI, the frequency point information, and the bandwidth. Information on one wideband carrier includes information on five cells under the second node, and wideband carrier identifiers of five wideband carriers. Each of the five cells does not include the SSB, and information on each of the five cells includes the PCI, the frequency point information, the bandwidth, and the cell role indication.

In one case of embodiment fifteen, the above-mentioned cell identifier includes an NCGI.

In one case of embodiment fifteen, when the cell under the second node is an FDD serving cell, the frequency point information includes an uplink NR-ARFCN and a downlink NR-ARFCN. When the cell under the second node is an FDD neighbor cell, the frequency point information includes the downlink NR-ARFCN. When the cell under the second node is a TDD serving cell or a TDD neighbor cell, the frequency point information includes an NR-ARFCN. It is to be noted that since no distinction is made between uplink and downlink of the NR-ARFCN in a TDD system, the frequency point information includes the NR-ARFCN. Therefore, the above-mentioned uplink NR-ARFCN, downlink NR-ARFCN, and NR-ARFCN are three different concepts.

In one case of embodiment fifteen, when the cell under the second node includes the SSB, the downlink NR-ARFCN includes a center frequency point of the SSB or a GSCN; or the uplink NR-ARFCN or the downlink NR-ARFCN includes an absolute frequency position of a reference point A of a wideband carrier to which the cell belongs. When the cell under the second node does not include the SSB, the uplink NR-ARFCN or the downlink NR-ARFCN includes the absolute frequency position of the reference point A of the wideband carrier to which the cell belongs.

In one case of embodiment fifteen, when the cell under the second node includes the SSB, the NR-ARFCN includes the center frequency point of the SSB or the GSCN; or the NR-ARFCN includes the absolute frequency position of the reference point A of the wideband carrier to which the cell belongs. When the cell under the second node does not include the SSB, the NR-ARFCN includes the absolute frequency position of the reference point A of the wideband carrier to which the cell belongs.

In one case of embodiment fifteen, the above-mentioned wideband carrier identifier includes a frequency point of the wideband carrier, an absolute frequency position of a reference point A of the wideband carrier, or a nonnegative integer.

In one case of embodiment fifteen, the cell role indication includes at least one of: an indication of whether the cell under the second node servers as an SA cell, an indication of whether the cell under the second node only serves as an NSA cell, an indication of whether the cell under the second node serves as a Pcell, an indication of whether the cell under the second node serves as a Pscell, or an indication of whether the cell under the second node only serves as an Scell.

In step S1102, the first node acquires information on the cell under the second node from the first message. Information on the cell acquired by the first node is determined according to the information on the cell carried by the first message, and different information on the cell carried by the first message will lead to different information on the cell acquired by the first node. If the first message carries information on one cell, the first node can acquire information on one cell; and if the first message carries information on a plurality of cells, the first node may acquire information on corresponding plurality of cells.

In one case of embodiment fifteen, the first message carries the information on one or more cells under the second node, and the information on each cell includes the cell identifier, the information of whether the cell belongs to the wideband carrier, the PCI, the frequency point information, the information of whether the cell includes the SSB, the indication of whether the SSB is associated with the RMSI, and the information of whether the SSB is on the synchronization signal raster. At this time, the information on the cell acquired by the first node includes the cell identifier, the information of whether the cell belongs to the wideband carrier, the PCI, the frequency point information, the information of whether the cell includes the SSB, the indication of whether the SSB is associated with the RMSI, and the information of whether the SSB is on the synchronization signal raster.

After step S1101, the first node may determine a type of the cell according to the information on the cell.

In one case of embodiment fifteen, the information on the cell acquired by the first node includes the cell identifier, the information of whether the cell belongs to the wideband carrier, the PCI, the frequency point information, the information of whether the cell includes the SSB, the indication of whether the SSB is associated with the RMSI, and the information of whether the SSB is on the synchronization signal raster. The information of whether the cell belongs to the wideband carrier is that the cell belongs to the wideband carrier, the information of whether the cell includes the SSB is that the cell includes the SSB, the indication of whether the SSB is associated with the RMSI is that the SSB is associated with the RMSI, and the information of whether the SSB is on the synchronization signal raster is that the SSB is on the synchronization signal raster. At this time, the first node can determine that the cell can serve as the SA cell.

Embodiment Sixteen

Figure 13:
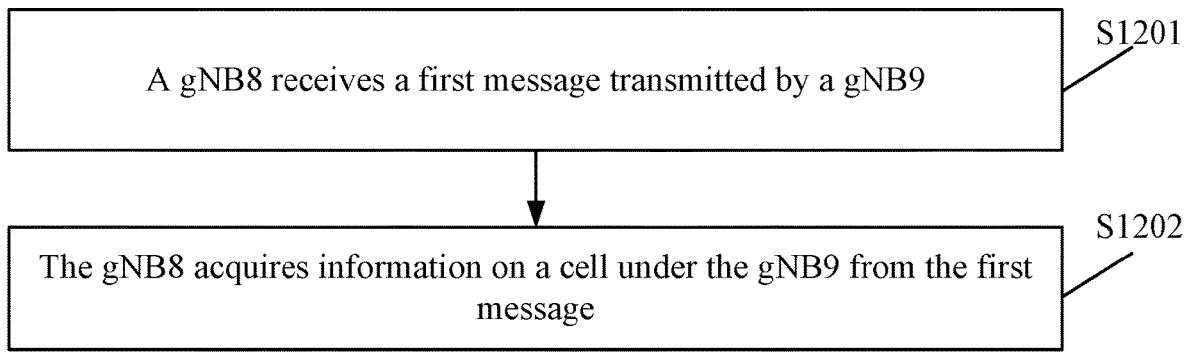
FIG. 13 is a flowchart of a method for acquiring information according to embodiment sixteen of the present disclosure.

Embodiment sixteen of the present disclosure provides a method for acquiring information, and the method can be applied to a gNB. As shown in FIG. 13, the method includes steps described below.

In step 1201, a gNB8 receives a first message transmitted by a gNB9.

The first message may be an XN SETUP REQUEST, an XN SETUP RESPONSE, an NG-RAN NODE CONFIGURATION UPDATE, or an NG-RAN NODE CONFIGURATION UPDATE ACKNOWLEDGE of an Xn interface.

The first message is related to a wideband carrier of the gNB9, and one or more cells are included under the gNB9. When a plurality of cells is included under the gNB9, the plurality of cells may belong to a same wideband carrier, or the plurality of cells may belong to different wideband carriers.

The first message carries information on one or more cells under the gNB9, and information on each cell includes an NCGI and information on one or more physical cells. Information on each physical cell includes a PCI, frequency point information, a bandwidth, information of whether the physical cell includes an SSB (for example, may be expressed by whether SMTC is included, the SSB is included if the SMTC is included; and the SSB is not included if the SMTC is not included), an indication of whether the SSB is associated with RMSI, and information of whether the SSB is on a synchronization signal raster.

In step S1202, the gNB8 acquires information on the cell under the gNB9 from the first message.

Information on the cell acquired by the gNB8 is the NCGI and the information on one or more physical cells. The information on each physical cell includes the PCI, the frequency point information, the bandwidth, the information of whether the physical cell includes the SSB, the indication of whether the SSB is associated with the RMSI, and the information of whether the SSB is on the synchronization signal raster.

After step S1202, the gNB8 determines a type of a physical cell subordinate to the cell according to the acquired information on the cell.

In one case of embodiment sixteen, the gNB8 acquires information on a cell, and the information on the cell includes the NCGI and information on a plurality of physical cells. At this time, the one case indicates that the cell belongs to the wideband carrier and includes the plurality of physical cells. The information on each physical cell includes the PCI, the frequency point information, the bandwidth, the information of whether the physical cell includes the SSB, the indication of whether the SSB is associated with the RMSI, and the information of whether the SSB is on the synchronization signal raster. When a terminal under the cell is in an idle state, if information on one of the plurality of physical cells includes that the physical cell includes the SSB, the SSB is associated with the RMSI, and the SSB is on the synchronization signal raster, then the physical cell can serve as the SA cell, otherwise the physical cell can only serve as the NSA cell. When the terminal under the cell is in a connected state, if the information on one of the plurality of physical cells includes that the physical cell includes the SSB, the SSB is associated with the RMSI, and the SSB is on the synchronization signal raster, the physical cell can serve as a Pcell; otherwise, if the physical cell includes the SSB, the physical cell can serve as a Pscell, and if the physical cell does not include the SSB, the physical cell can only serve as an Scell.

In one case of embodiment sixteen, the gNB9 acquires information on one cell, and the information on one cell includes the NCGI and information on one physical cell. At this time, the one case indicates that the cell belongs to a common carrier and includes one physical cell. It is to be noted that if the cell includes the plurality of physical cells, the information on the cell may include only the NCGI and the information on one physical cell (for example, the information on the cell carried in the first message includes only the NCGI and the information on one physical cell among the plurality of physical cells subordinate to the cell). At this time, the cell belongs to the wideband carrier. In order to avoid being unable to distinguish whether the cell belongs to the common carrier or the wideband carrier when the information on the cell includes the information on one physical cell, it is necessary to stipulate that when the cell includes the plurality of physical cells, the information on the cell carried by the first message must include the information on the plurality of physical cells, and can not only include the information on one physical cell. Under the stipulation, when the information on the cell includes the information on one physical cell, it indicates that the cell belongs to the common carrier and includes one physical cell.

Embodiment Seventeen

Figure 14:
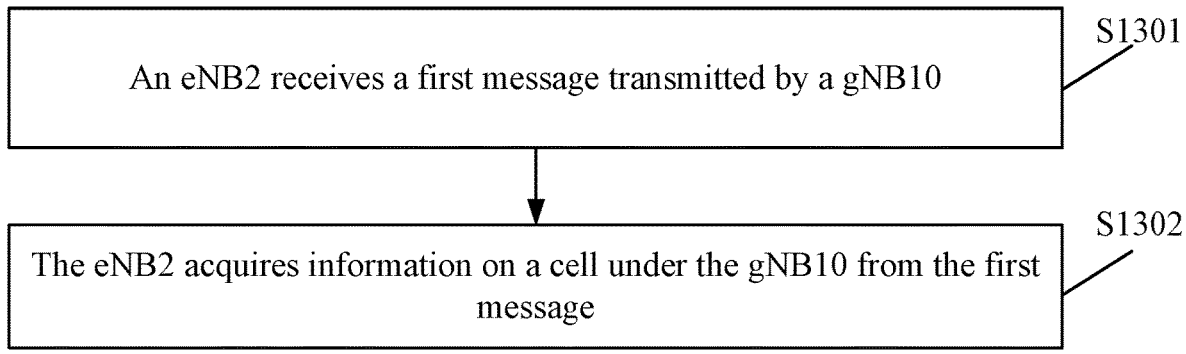
FIG. 14 is a flowchart of a method for acquiring information according to embodiment seventeen of the present disclosure.

Embodiment seventeen of the present disclosure provides a method for acquiring information, and the method can be applied to an eNB. As shown in FIG. 14, the method includes steps described below.

In step 1301, an eNB2 receives a first message transmitted by a gNB10.

The first message may be an EN-DC X2 SETUP REQUEST, an EN-DC X2 SETUP RESPONSE, an EN-DC CONFIGURATION UPDATE or an EN-DC CONFIGURATION UPDATE ACKNOWLEDGE of an EN-DC X2 interface.

The first message is related to a wideband carrier of the gNB10, and one or more cells are included under the gNB10. When a plurality of cells is included under the gNB10, the plurality of cells may belong to a same wideband carrier, or the plurality of cells may belong to different wideband carriers.

The first message carries information on one or more cells under the gNB10, and information on each cell includes an NCGI, information on one or more physical cells, and information of whether the cell belongs to the wideband carrier. Information on each physical cell includes a PCI, frequency point information, a bandwidth, information of whether the physical cell includes an SSB (for example, may be expressed by whether SMTC is included, the SSB is included if the SMTC is included; and the SSB is not included if the SMTC is not included), an indication of whether the SSB is associated with RMSI, and information of whether the SSB is on a synchronization signal raster.

In step S1302, the eNB2 acquires information on the cell under the gNB10 from the first message.

The information on the cell acquired by the eNB2 is the NCGI, the information on one or more physical cells, and the information of whether the cell belongs to the wideband carrier. The information on each physical cell includes the PCI, the frequency point information, the bandwidth, the information of whether the physical cell includes the SSB, the indication of whether the SSB is associated with the RMSI, and the information of whether the SSB is on the synchronization signal raster.

After step S1302, the eNB2 determines a type of a physical cell subordinate to the cell according to the acquired information on the cell.

In one case of embodiment seventeen, the eNB2 acquires information on a cell, and the information on the cell includes the NCGI, information on a plurality of physical cells, and information that the cell belongs to the wideband carrier. At this time, the one case indicates that the cell belongs to the wideband carrier and includes the plurality of physical cells. The information on each physical cell includes the PCI, the frequency point information, the bandwidth, the information of whether the physical cell includes the SSB, the indication of whether the SSB is associated with the RMSI, and the information of whether the SSB is on the synchronization signal raster. When a terminal under the cell is in an idle state, if information on a certain physical cell includes that the physical cell includes the SSB, the SSB is associated with the RMSI, and the SSB is on the synchronization signal raster, then the physical cell can serve as an SA cell, otherwise the physical cell can only serve as an NSA cell. When the terminal under the cell is in a connected state, if the information on a certain physical cell includes that the physical cell includes the SSB, the SSB is associated with the RMSI, and the SSB is on the synchronization signal raster, the physical cell can serve as a Pcell; otherwise, if the physical cell includes the SSB, the physical cell can serve as a Pscell, and if the physical cell does not include the SSB, the physical cell can only serve as an Scell.

In one case of embodiment seventeen, the eNB2 acquires information on a cell, and the information on the cell includes the NCGI, information on one physical cell, and information that the cell does not belong to the wideband carrier. At this time, the one case indicates that the cell belongs to the common carrier and includes the plurality of physical cells.

Embodiment Eighteen

Figure 15:
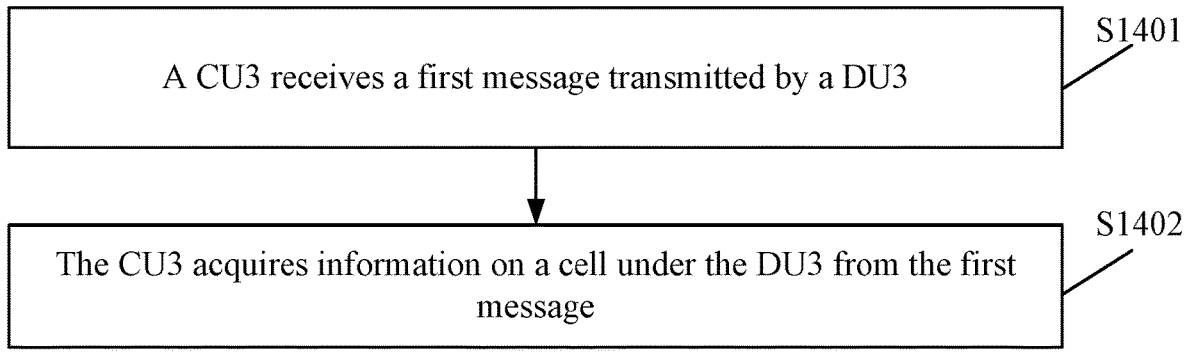
FIG. 15 is a flowchart of a method for acquiring information according to embodiment eighteen of the present disclosure.

Embodiment eighteen of the present disclosure provides a method for acquiring information, and the method can be applied to a CU. As shown in FIG. 15, the method includes steps described below.

In step 1401, a CU3 receives a first message transmitted by a DU3.

The first message may be an F1 SETUP REQUEST, a GNB-DU CONFIGURATION UPDATE, and a GNB-CU CONFIGURATION UPDATE ACKNOWLEDGE of an F1 interface.

The first message is related to a wideband carrier of the DU3, and one or more cells are included under the DU3. When a plurality of cells is included under the DU3, the plurality of cells may belong to a same wideband carrier, or the plurality of cells may belong to different wideband carriers.

The first message carries information on one or more cells under the DU3, and information on each cell includes an NCGI, information of whether the cell belongs to the wideband carrier, a PCI, frequency point information, a bandwidth, information of whether the cell includes an SSB (for example, may be expressed by whether SMTC is included, the SSB is included if the SMTC is included; and the SSB is not included if the SMTC is not included), an indication of whether the SSB is associated with RMSI, and information of whether the SSB is on a synchronization signal raster.

In step S1402, the CU3 acquires information on the cell under the DU3 from the first message.

The information on the cell acquired by the CU3 is the NCGI, the information of whether the cell belongs to the wideband carrier, the PCI, the frequency point information, the bandwidth, the information of whether the cell includes the SSB, the indication of whether the SSB is associated with the RMSI, and the information of whether the SSB is on the synchronization signal raster.

After step S1402, the CU3 determines a type of the cell according to the acquired information on the cell.

In one case of embodiment four, the CU3 acquires information on one cell, and the information on the cell includes the NCGI, and information that the cell belongs to the wideband carrier. At this time, it indicates that the cell belongs to the wideband carrier. The information on the cell further includes the PCI, the frequency point information, the bandwidth, the information of whether the cell includes the SSB, the indication of whether the SSB is associated with the RMSI, and the information of whether the SSB is on the synchronization signal raster. When a terminal under the cell is in an idle state, if information on the cell includes that the cell includes the SSB, the SSB is associated with the RMSI, and the SSB is on the synchronization signal raster, then the cell can serve as an SA cell, otherwise the cell can only serve as an NSA cell. When the terminal under the cell is in a connected state, if the information on the cell includes that the cell includes the SSB, the SSB is associated with the RMSI, and the SSB is on the synchronization signal raster, the cell can serve as the Pcell; otherwise, if the cell includes the SSB, the cell can serve as the Pscell, and if the physical cell does not include the SSB, the cell can only serve as the Scell.

Embodiment Nineteen

Figure 16:
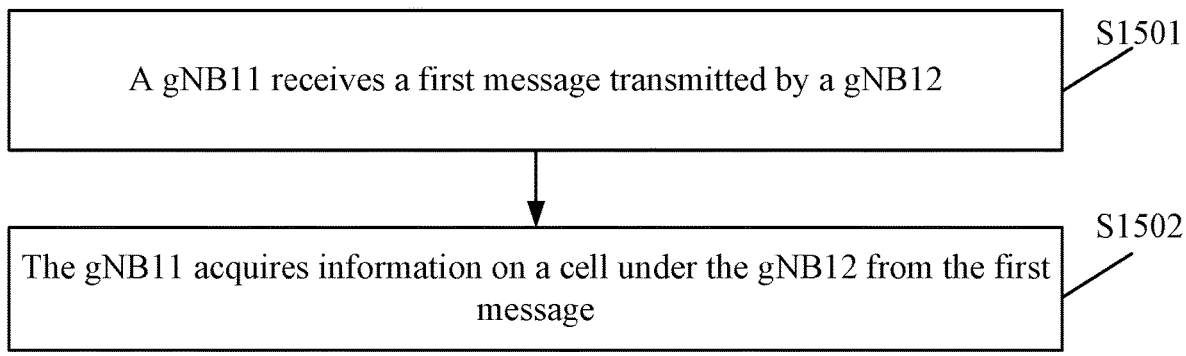
FIG. 16 is a flowchart of a method for acquiring information according to embodiment nineteen of the present disclosure.

Embodiment nineteen of the present disclosure provides a method for acquiring information, and the method can be applied to a gNB. As shown in FIG. 16, the method includes steps described below.

In step 1501, a gNB11 receives a first message transmitted by a gNB12.

The first message may be an XN SETUP REQUEST, an XN SETUP RESPONSE, an NG-RAN NODE CONFIGURATION UPDATE, or an NG-RAN NODE CONFIGURATION UPDATE ACKNOWLEDGE of an Xn interface.

The first message is related to a wideband carrier of the gNB12, and one or more cells are included under the gNB12. When a plurality of cells is included under the gNB12, the plurality of cells may belong to a same wideband carrier, or the plurality of cells may belong to different wideband carriers.

The first message carries information on one or more cells under the gNB12, and information on each cell includes an NCGI, a wideband carrier identifier of a wideband carrier to which the cell belongs, a PCI, frequency point information, a bandwidth, information of whether the cell includes an SSB (for example, may be expressed by whether SMTC is included, the SSB is included if the SMTC is included; and the SSB is not included if the SMTC is not included), an indication of whether the SSB is associated with RMSI, and information of whether the SSB is on a synchronization signal raster.

In step S1502, the gNB11 acquires information on the cell under the gNB12 from the first message.

The information on the cell acquired by the gNB11 is the NCGI, the wideband carrier identifier of the wideband carrier to which the cell belongs, the PCI, the frequency point information, the bandwidth, the information of whether the cell includes the SSB, the indication of whether the SSB is associated with the RMSI, and the information of whether the SSB is on the synchronization signal raster.

After step S1502, the gNB11 determines a type of the cell according to the acquired information on the cell.

In one case of embodiment nineteen, the gNB11 acquires information on one cell, and the information on the cell includes the NCGI, and the wideband carrier identifier of the wideband carrier to which the cell belongs. At this time, it indicates that the cell belongs to the wideband carrier. The information on the cell further includes the PCI, the frequency point information, the bandwidth, the information of whether the cell includes the SSB, the indication of whether the SSB is associated with the RMSI, and the information of whether the SSB is on the synchronization signal raster. When a terminal under the cell is in an idle state, if information on the cell includes that the cell includes the SSB, the SSB is associated with the RMSI, and the SSB is on the synchronization signal raster, then the cell can serve as an SA cell, otherwise the cell can only serve as an NSA cell. When the terminal under the cell is in a connected state, if the information on the cell includes that the cell includes the SSB, the SSB is associated with the RMSI, and the SSB is on the synchronization signal raster, the cell can serve as the Pcell; otherwise, if the cell includes the SSB, the cell can serve as the Pscell, and if the physical cell does not include the SSB, the cell can only serve as the Scell.

Embodiment Twenty

Figure 17:
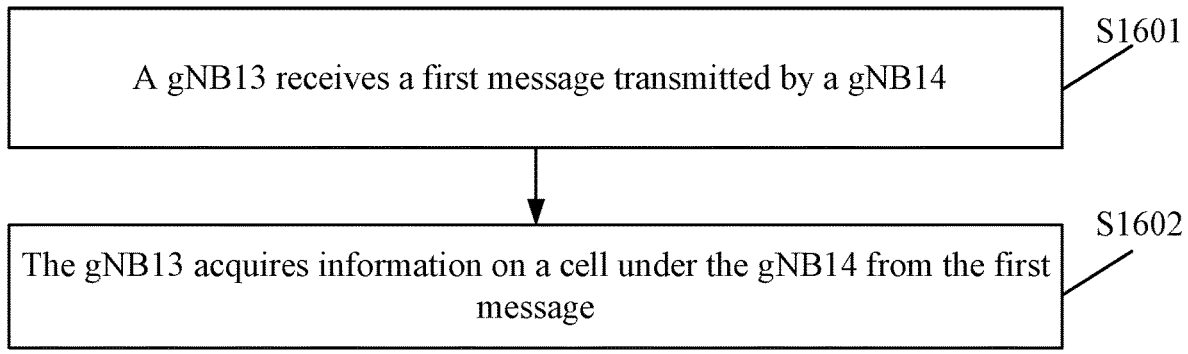
FIG. 17 is a flowchart of a method for acquiring information according to embodiment twenty of the present disclosure.

Embodiment twenty of the present disclosure provides a method for acquiring information, and the method can be applied to a gNB. As shown in FIG. 17, the method includes steps described below.

In step 1601, a gNB13 receives a first message transmitted by a gNB14.

The first message may be an XN SETUP REQUEST, an XN SETUP RESPONSE, an NG-RAN NODE CONFIGURATION UPDATE, or an NG-RAN NODE CONFIGURATION UPDATE ACKNOWLEDGE of an Xn interface.

The first message is related to a wideband carrier of the gNB14, and one or more cells are included under the gNB14. When a plurality of cells is included under the gNB14, the plurality of cells may belong to a same wideband carrier, or the plurality of cells may belong to different wideband carriers.

The first message carries information on one or more A-type cells under the gNB14, and each A-type cell includes the SSB, and the SSB is associated with the RMSI. Information on the each A-type cell includes an NCGI, a wideband carrier identifier of a wideband carrier to which the cell belongs, a PCI, frequency point information, a bandwidth, and information of whether the SSB of the cell is on the synchronization signal raster.

The first message further carries information on one or more B-type cells under the gNB14, each B-type cell includes the SSB, and the SSB is not associated with the RMSI; or the each B-type cell does not include the SSB. Information on the each B-type cell includes the wideband carrier identifier of the wideband carrier to which the cell belongs, whether the cell includes the SSB, the PCI, the frequency point information, the bandwidth, and a cell role indication.

In step S1602, the gNB13 acquires information on the cell under the gNB14 from the first message.

The information on the cell acquired by the gNB13 is information on the A-type cell (includes the NCGI, the wideband carrier identifier of the wideband carrier to which the cell belongs, the PCI, the frequency point information, the bandwidth, and the information of whether the SSB is on the synchronization signal raster) and information on the B-type cell (includes the wideband carrier identifier of the wideband carrier to which the cell belongs, whether the cell includes the SSB, the PCI, the frequency point information, the bandwidth, and the cell role indication).

After step S1602, the gNB13 determines a type of the cell according to the acquired information on the cell.

In one case of embodiment twenty, the gNB13 acquires information on one A-type cell, and the information on the cell includes the NCGI, a wideband carrier identifier of a wideband carrier to which the cell belongs, the PCI, the frequency point information, the bandwidth, and the information of whether the SSB of the cell is on the synchronization signal raster. At this time, it indicates that the cell belongs to the wideband carrier. If the information on the cell includes that the SSB of the cell is on the synchronization signal raster, the cell can serve as an SA cell; and if the information on the cell includes that the SSB of the cell is off the synchronization signal raster, the cell can only serve as an NSA cell. The gNB13 further acquires information on one B-type cell, and the information on the cell includes a wideband carrier identifier of a wideband carrier to which the cell belongs, the PCI, the frequency point information, the bandwidth, whether the cell includes the SSB, and the cell role indication. At this time, it indicates that the cell belongs to the wideband carrier. If the information on the cell includes that the cell includes the SSB, it indicates that the SSB is not associated with the RMSI, and then the cell can serve as a Pscell; and if the information on the cell does not include the SSB, the cell can only serve as an Scell.

Embodiment Twenty-One

Figure 18:
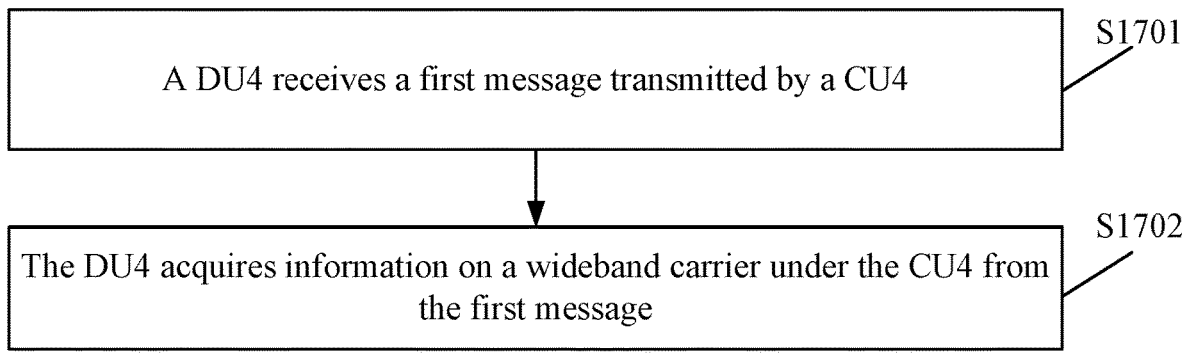
FIG. 18 is a flowchart of a method for acquiring information according to embodiment twenty-one of the present disclosure.

Embodiment twenty-one of the present disclosure provides a method for acquiring information, and the method can be applied to a DU. As shown in FIG. 18, the method includes steps described below.

In step 1701, a DU4 receives a first message transmitted by a CU4.

The first message may be an F1 SETUP REQUEST, a GNB-CU CONFIGURATION UPDATE, and a GNB-CU CONFIGURATION UPDATE ACKNOWLEDGE of an F1 interface.

The first message is related to a wideband carrier of the CU4, and one or more cells are included under the CU4. When a plurality of cells is included under the CU4, the plurality of cells may belong to a same wideband carrier, or the plurality of cells may belong to different wideband carriers.

The first message carries information on one or more wideband carriers under the CU4, information on each wideband carrier includes information on one or more A-type cells under the CU4, information on one or more B-type cells under the CU4, and wideband carrier identifiers of wideband carriers to which all cells belong.

Each A-type cell includes an SSB, and the SSB is associated with RMSI. Information on the each A-type cell includes an NCGI, a PCI, frequency point information, a bandwidth, and information of whether the SSB of the cell is on a synchronization signal raster.

Each B-type cell includes the SSB, and the SSB is not associated with the RMSI; or the each B-type cell does not include the SSB. Information on the each B-type cell includes whether the cell includes the SSB, the PCI, the frequency point information, the bandwidth, and a cell role indication.

In step S1702, the DU4 acquires information on the wideband carrier under the CU4 from the first message.

The information on the wideband carrier acquired by the DU4 is the information on one or more A-type cells under the CU4, information on one or more B-type cells under the CU4, and the wideband carrier identifiers of wideband carriers to which all cells belong.

After step S1702, the DU4 determines a type of the cell according to the acquired information on the cell.

In one case of embodiment twenty-one, the DU4 acquires a piece of information on a wideband carrier, and the information on the wideband carrier includes information on one A-type cell, information on one B-type cell, and wideband carrier identifiers of wideband carriers to which all cells belong. At this time, it indicates that both the A-type cell and the B-type cell belong to the wideband carrier. Information on the A-type cell includes the NCGI, the PCI, the frequency point information, the bandwidth, and the information of whether the SSB of the cell is on the synchronization signal raster. If the information on the cell includes that the SSB of the cell is on the synchronization signal raster, the cell can serve as an SA cell; and if the information on the cell includes that the SSB of the cell is off the synchronization signal raster, the cell can only serve as an NSA cell. Information on the B-type cell includes the PCI, the frequency point information, the bandwidth, whether the cell includes the SSB, and the cell role indication. If the information on the cell includes that the cell includes the SSB, it indicates that the SSB is not associated with the RMSI, and then the cell can serve as a Pscell; and if the information on the cell does not include the SSB, the cell can only serve as an Scell.

Embodiment Twenty-Two

Figure 19:
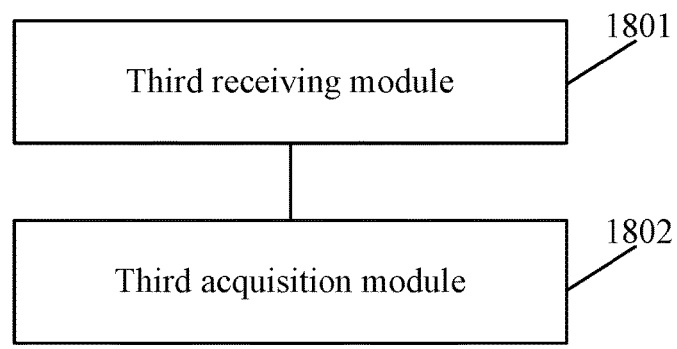
FIG. 19 is a structural block diagram of a device for acquiring information according to embodiment twenty-two of the present disclosure.

Embodiment twenty-two of the present disclosure provides a device for acquiring information, and the device can be applied to a first node. As shown in FIG. 19, the device includes a third receiving module 1801 and a third acquisition module 1802. The third receiving module 801 is used for the first node to receive a first message transmitted by a second node, where the first message is related to a wideband carrier of the second node. The third acquisition module 1802 is used for the first node to acquire information on a cell under the second node from the first message.

Embodiment Twenty-Three

Embodiment twenty-three of the present disclosure provides an apparatus for acquiring information, and the apparatus includes a processor and a memory coupled to the processor. The memory stores programs for acquiring information and executed on the processor, and when executed by the processor, the programs for acquiring information implement steps described below.

In step S1101, a first node receives a first message transmitted by a second node, where the first message is related to a wideband carrier of the second node.

In step S1102, the first node acquires information on a cell under the second node from the first message.

In one case of embodiment twenty-three, steps in embodiments fifteen to twenty-one can further be implemented when the processor executes the programs.

Embodiment Twenty-Four

Embodiment fourteen provides a computer storage medium storing programs for acquiring information, and when the programs for acquiring information is executed by a processor, the following steps are implemented.

In step S1101, a first node receives a first message transmitted by a second node, where the first message is related to a wideband carrier of the second node.

In step S1102, the first node acquires information on a cell under the second node from the first message.

In this embodiment, the above-mentioned storage medium may include, but is not limited to, a USB flash disk, a read-only memory (ROM), a random access memory (RAM), a mobile hard disk, a magnetic disk, an optical disk or another medium capable of storing program codes.

In one case of embodiment twenty-four, steps in embodiments fifteen to twenty-one can further be implemented when the processor executes the programs.

Embodiment Twenty-Five

A second node transmits a first message to a first node. The first message carries a piece of or a plurality of pieces of information on a cell. Each piece of information on the cell includes a cell identifier (for example, an NCGI), and a piece of or a plurality of pieces of information on a physical cell. Each piece of information on the physical cell includes at least one of: a PCI, frequency point information, a bandwidth, information of whether an SSB is included (for example, may be expressed by whether SMTC is included, the SSB is included if the SMTC is included; and the SSB is not included if the SMTC is not included), an indication of whether the SSB is associated with RMSI, an indication of whether the SSB is on a synchronization signal raster (e.g. on the synchronization (on-sync) signal raster or off the synchronization (off-sync) signal raster), or a cell role indication. The each piece of information on the cell may further include an indication of whether the cell is a wideband carrier cell.

The first node acquires information on the cell according to the first message. For example, when a certain piece of information on the cell includes a plurality of pieces of information on the physical cell, it indicates that the cell is a wideband carrier and includes a plurality of physical cells; when a certain piece of information on the cell includes a piece of information on the physical cell, it indicates that the cell is a common carrier and only includes one physical cell, or when a certain piece of information on the cell includes an indication of whether the cell is the wideband carrier cell, whether the cell is the wideband carrier or a common carrier cell is distinguished according to the indication; if a certain piece of information on the physical cell indicates that the SSB is included, the SSB is associated with the RMSI, and the SSB is on the synchronization signal raster, a corresponding physical cell can serve as an SA cell, otherwise the corresponding physical cell can only serve as an NSA cell; and if a certain piece of information on the physical cell indicates that the SSB is not included, a corresponding physical cell can only serve as an Scell.

The frequency point information includes at least one of: a center frequency point of the SSB, a GSCN, or an absolute frequency position of a reference point A of a wideband carrier to which the cell belongs.

Embodiment Twenty-Six

A second node transmits a second message to a first node. The second message carries a cell identifier (for example, an NCGI) and at least one of: a PCI or frequency point information.

The first node acquires information on a cell according to the second message. For example, the first node acquires information on an uplink initial bandwidth part and a downlink initial BWP of a corresponding cell according to the PCI and the frequency point information. An idle or inactive UE monitors system information and paging information on the downlink initial BWP; and the idle or inactive UE performs random access on the downlink initial BWP and the uplink initial BWP.

The frequency point information includes at least one of: a center frequency point of the SSB, a GSCN, or an absolute frequency position of a reference point A of a wideband carrier to which the cell belongs.

Embodiment Twenty-Seven

A second node transmits a second message to a first node. The second message carries a cell identifier (for example, an NCGI) and at least one of: a PCI or frequency point information.

The first node acquires information on a cell according to the second message. For example, the first node acquires information on an uplink initial bandwidth part and a downlink initial BWP of a corresponding cell according to the PCI and the frequency point information, but the first node considers that a corresponding downlink initial BWP and uplink initial BWP cannot be adopted (such as a load reason).

The first node transmits a third message to the second node. The third message carries a reason for not being adopted (for example, corresponding uplink initial bandwidth part and BWP downlink initial BWP can not be carried) and/or a recommended cell list, and each item of the recommended cell list includes at least one of: a cell identifier, the PCI, and frequency point information.

The frequency point information includes at least one of: a center frequency point of the SSB, a GSCN, or an absolute frequency position of a reference point A of a wideband carrier to which the cell belongs.

Embodiment Twenty-Eight

A second node transmits a first message to a first node. The first message carries a piece of or a plurality of pieces of information on a cell. Each piece of information on the cell includes at least one of: a cell identifier (for example, an NCGI), a PCI, frequency point information, a bandwidth, a wideband carrier identifier of a wideband carrier to which the cell belongs, information of whether an SSB is included (for example, may be expressed by whether SMTC is included, the SSB is included if the SMTC is included; and the SSB is not included if the SMTC is not included), an indication of whether the SSB is associated with RMSI, an indication of whether the SSB is on a synchronization signal raster (e.g. on the synchronization (on-sync) signal raster or off the synchronization (off-sync) signal raster), a cell role indication, or information of whether the cell belongs to the wideband carrier.

The first node acquires information on the cell according to the first message. For example, when a certain piece of information on the cell includes the wideband carrier identifier of the wideband carrier to which the cell belongs, it indicates that the cell belongs to a wideband carrier cell, or when a certain piece of information on the cell includes the information of whether the cell belongs to the wideband carrier, whether the cell belongs to the wideband carrier is distinguished according to the information; if the information on the cell indicates that the SSB is included, the SSB is associated with the RMSI, and the SSB is on the synchronization signal raster, a corresponding physical cell can serve as an SA cell, otherwise the corresponding physical cell can only serve as an NSA cell; and if the information on the cell indicates that the SSB is not included, a corresponding cell can only serve as an Scell.

The frequency point information includes at least one of: a center frequency point of the SSB, a GSCN, or an absolute frequency position of a reference point A of a wideband carrier to which the cell belongs.

Embodiment Twenty-Nine

A second node transmits a first message to a first node. The first message carries one piece or a plurality of pieces of information on a cell (hereinafter referred to as information on an A-type cell), where the cell includes an SSB and the SSB is associated with RMSI. Each piece of information on the A-type cell includes a cell identifier (for example, an NCGI), a wideband carrier identifier of a wideband carrier to which the cell belong, and at least one of: a PCI, frequency point information, a bandwidth, an indication of whether the SSB is on a synchronization signal raster (e.g. on the synchronization (on-sync) signal raster or off the synchronization (off-sync) signal raster), or a cell role indication. The first message may further carry one piece or a plurality of pieces of information on a cell (hereinafter referred to as information on a B-type cell), where the cell includes the SSB and the SSB is not associated with the RMSI, or the cell does not include the SSB. Each piece of information on the B-type cell includes a wideband carrier identifier of a wideband carrier to which the cell belong, and at least one of: the PCI, the frequency point information, the bandwidth, information of whether the SSB is included (for example, may be expressed by whether SMTC is included, the SSB is included if the SMTC is included; and the SSB is not included if the SMTC is not included), the indication of whether the SSB is on the synchronization signal raster (e.g. on the synchronization (on-sync) signal raster or off the synchronization (off-sync) signal raster), or the cell role indication.

The first node acquires information on the cell according to the first message. For example, if the information on the A-type cell indicates that the SSB is on the synchronization signal raster, a corresponding cell can serve as an SA cell, otherwise the corresponding cell can only serve as an NSA cell; and if the information on the B-type cell indicates that the SSB is included, a corresponding cell can serve as a Pscell, otherwise the corresponding cell can only serve as an Scell.

The frequency point information includes at least one of: a center frequency point of the SSB, a GSCN, or an absolute frequency position of a reference point A of a wideband carrier to which the cell belongs.

Embodiment Thirty

A second node transmits a first message to a first node. The first message carries one piece or a plurality of pieces of information on a wideband carrier. Each piece of information on a wideband carrier includes information on a cell (hereinafter referred to as information on an A-type cell), where the cell includes an SSB and the SSB is associated with RMSI. Each piece of information on the A-type cell includes a cell identifier (for example, an NCGI), and at least one of: a PCI, frequency point information, a bandwidth, an indication of whether the SSB is on a synchronization signal raster (e.g. on the synchronization (on-sync) signal raster or off the synchronization (off-sync) signal raster), or a cell role indication. Each piece of information on the wideband carrier may further include one piece or a plurality of pieces of information on a cell (hereinafter referred to as information on a B-type cell), where the cell includes the SSB and the SSB is not associated with the RMSI, or the cell does not include the SSB. Each piece of information on the B-type cell includes at least one of: the PCI, the frequency point information, the bandwidth, information of whether the SSB is included (for example, may be expressed by whether SMTC is included, the SSB is included if the SMTC is included; and the SSB is not included if the SMTC is not included), the indication of whether the SSB is on the synchronization signal raster (e.g. on the synchronization (on-sync) signal raster or off the synchronization (off-sync) signal raster), or the cell role indication.

The first node acquires information on the cell according to the first message. For example, if the information on the A-type cell indicates that the SSB is on the synchronization signal raster, a corresponding cell can serve as an SA cell, otherwise the corresponding cell can only serve as an NSA cell; and if the information on the B-type cell indicates that the SSB is included, a corresponding cell can serve as a Pscell, otherwise the corresponding cell can only serve as an Scell.

The frequency point information includes at least one of: a center frequency point of the SSB, a GSCN, or an absolute frequency position of a reference point A of a wideband carrier to which the cell belongs.

Embodiment Thirty-One

An SN (e.g. gNB2) transmits an 11th message to an MN (e.g. gNB1), and the 11th message carries one or more unknown PCIs. The unknown PCI refers to that a cell identifier (for example, an NCGI) corresponding to the PCI cannot be found locally.

After receives the 11th message, the MN acquires information on a cell corresponding to the unknown PCI carried in the 11th message through at least one of methods described below. The MN searches the cell identifier corresponding to the unknown PCI carried in the 11th message locally to directly acquire information on a corresponding cell. The MN instructs a selected UE to read system information related to the unknown PCI through a Uu interface to acquire the information on the cell corresponding to the unknown PCI carried in the 11th message.

An MN transmits a 12th message to the SN, and the 12th message carries a piece of or a plurality of pieces of information on a cell corresponding to the unknown PCI carried in the acquired 11th message and corresponding PCIs thereof.

The 11th message and the 12th message are existing messages or new messages of an Xn interface.

The information on the cell includes a cell identifier, and at least one of: a public land mobile network (PLMN) list corresponding to the cell, a band list, a tracking area code (TAC), an RAN area code (RANAC), frequency point information, a bandwidth, a wideband carrier identifier of a wideband carrier to which the cell belongs, information of whether an SSB is included (for example, may be expressed by whether SMTC is included, the SSB is included if the SMTC is included; and the SSB is not included if the SMTC is not included), an indication of whether the SSB is associated with RMSI, an indication of whether the SSB is on a synchronization signal raster (on the synchronization (on-sync) signal raster or off the synchronization (off-sync) signal raster), a cell role indication, or information of whether the cell belongs to the wideband carrier.

A condition for triggering the 11th message may be that a UE measurement report received by the SN carries the unknown PCI.

Embodiment Thirty-Two

An SN (e.g. gNB2) transmits a 21st message to an MN (e.g. eNB1), and the 21st message carries one or more unknown PCIs. The unknown PCI refers to that a cell identifier (for example, an NCGI) corresponding to the PCI cannot be found locally.

After receives the 21st message, the MN acquires information on a cell corresponding to the unknown PCI carried in the 21st message through at least one of methods described below. The MN searches the cell identifier corresponding to the unknown PCI carried in the 21st message locally to directly acquire information on a corresponding cell. The MN instructs a selected UE to read system information related to the unknown PCI through a Uu interface to acquire the information on the cell corresponding to the unknown PCI carried in the 21st message.

An MN transmits a 22nd message to the SN, and the 22nd message carries a piece of or a plurality of pieces of information on a cell corresponding to the unknown PCI carried in the acquired 21st message and corresponding PCIs thereof.

The 21st message and the 22nd message are existing messages or new messages of an EN-DC X2 interface.

The information on the cell includes a cell identifier, and at least one of: a PLMN list corresponding to the cell, a band list, a TAC, an RANAC, frequency point information, a bandwidth, a wideband carrier identifier of a wideband carrier to which the cell belongs, information of whether an SSB is included (for example, may be expressed by whether SMTC is included, the SSB is included if the SMTC is included; and the SSB is not included if the SMTC is not included), an indication of whether the SSB is associated with RMSI, an indication of whether the SSB is on a synchronization signal raster (e.g. on the synchronization (on-sync) signal raster or off the synchronization (off-sync) signal raster), a cell role indication, or information of whether the cell belongs to the wideband carrier.

A condition for triggering the 21st message may be that a UE measurement report received by the SN carries the unknown PCI.

Embodiment Thirty-Three

A DU transmits a 31st message to a CU, and the 31st message carries one or more unknown PCIs. The unknown PCI refers to that a cell identifier (for example, an NCGI) corresponding to the PCI cannot be found locally.

After receives the 31st message, the CU acquires information on a cell corresponding to the unknown PCI carried in the 31st message through at least one of methods described below. The CU searches the cell identifier corresponding to the unknown PCI carried in the 31st message locally to directly acquire information on a corresponding cell. The CU initiates a request to other DUs under the CU through an F1 interface to acquire the information on the cell corresponding to the unknown PCI carried in the 31st message.

The CU transmits a 32nd message to the DU, and the 32nd message carries a piece of or a plurality of pieces of information on a cell corresponding to the unknown PCI carried in the acquired 31st message and corresponding PCIs thereof.

The 31st message and the 32nd message are existing messages or new messages of an F1 interface.

The information on the cell includes a cell identifier, and at least one of: a PLMN list corresponding to the cell, a band list, a TAC, an RANAC, frequency point information, a bandwidth, a wideband carrier identifier of a wideband carrier to which the cell belongs, information of whether an SSB is included (for example, may be expressed by whether SMTC is included, the SSB is included if the SMTC is included; and the SSB is not included if the SMTC is not included), an indication of whether the SSB is associated with RMSI, an indication of whether the SSB is on a synchronization signal raster (e.g. on the synchronization (on-sync) signal raster or off the synchronization (off-sync) signal raster), a cell role indication, or information of whether the cell belongs to the wideband carrier.

A condition for triggering the 31st message may be that a UE measurement report received by the DU carries the unknown PCI, or the message from the CU and received by the DU carries the unknown PCI.

Embodiment Thirty-Four

A CU transmits a 41st message to a DU, and the 41st message carries one or more unknown PCIs. The unknown PCI refers to that a cell identifier (for example, an NCGI) corresponding to the PCI cannot be found locally.

After receives the 41st message, the DU acquires information on a cell corresponding to the unknown PCI carried in the 41st message through at least one of methods described below. The DU searches the cell identifier corresponding to the unknown PCI carried in the 41st message locally to directly acquire information on a corresponding cell. The DU instructs a selected UE to read system information related to the unknown PCI through a Uu interface to acquire the information on the cell corresponding to the unknown PCI carried in the 41st message.

The DU transmits a 42nd message to the CU, and the 42nd message carries a piece of or a plurality of pieces of information on a cell corresponding to the unknown PCI carried in the acquired 41st message and corresponding PCIs thereof.

The 41st message and the 42nd message are existing messages or new messages of an F1 interface.

The information on the cell includes a cell identifier, and at least one of: a PLMN list corresponding to the cell, a band list, a TAC, an RANAC, frequency point information, a bandwidth, a wideband carrier identifier of a wideband carrier to which the cell belongs, information of whether an SSB is included (for example, may be expressed by whether SMTC is included, the SSB is included if the SMTC is included; and the SSB is not included if the SMTC is not included), an indication of whether the SSB is associated with RMSI, an indication of whether the SSB is on a synchronization signal raster (e.g. on the synchronization (on-sync) signal raster or off the synchronization (off-sync) signal raster), a cell role indication, or information of whether the cell belongs to the wideband carrier.

A condition for triggering the 41st message may be that the message from the DU and received by the CU carries the unknown PCI, or a message from other CUs and received by the CU carries the unknown PCI, or a message from other base stations (e.g. gNB or eNB) and received by the CU carries the unknown PCI.

Embodiment Thirty-Five

A DU (e.g. DU2) of an SN transmits a 51st message to a CU (e.g. CU2) of an SN, and the 51st message carries one or more unknown PCIs. The unknown PCI refers to that a cell identifier (for example, an NCGI) corresponding to the PCI cannot be found locally.

After the CU2 receives the 51st message, the CU2 does not find the cell identifier corresponding to the unknown PCI carried in the 51st message locally, and the CU2 transmits a 52nd message to the MN.

After receives the 52nd message, an MN acquires information on a cell corresponding to the unknown PCI carried in the 52nd message through at least one of methods described below. The MN searches the cell identifier corresponding to the unknown PCI carried in the 52nd message locally to directly acquire information on a corresponding cell. The MN instructs a selected UE to read system information related to the unknown PCI through a Uu interface to acquire the information on the cell corresponding to the unknown PCI carried in the 52nd message.

The MN transmits a 53rd message to the CU2, and the 53rd message carries a piece of or a plurality of pieces of information on a cell corresponding to the unknown PCI carried in the acquired 52nd message and corresponding PCIs thereof.

The CU2 transmits a 54th message to the DU2, and the 54th message carries a piece of or a plurality of pieces of information on a cell corresponding to the unknown PCI carried in the acquired 51st message and corresponding PCIs thereof.

The 51st message and the 54th message are existing messages or new messages of an F1 interface.

The 52nd message and the 53rd message are existing messages or new messages of an EN-DC X2 interface or an Xn interface.

The information on the cell includes a cell identifier, and at least one of: a PLMN list corresponding to the cell, a band list, a TAC, an RANAC, frequency point information, a bandwidth, a wideband carrier identifier of a wideband carrier to which the cell belongs, information of whether an SSB is included (for example, may be expressed by whether SMTC is included, the SSB is included if the SMTC is included; and the SSB is not included if the SMTC is not included), an indication of whether the SSB is associated with RMSI, an indication of whether the SSB is on a synchronization signal raster (e.g. on the synchronization (on-sync) signal raster or off the synchronization (off-sync) signal raster), a cell role indication, or information of whether the cell belongs to the wideband carrier.

A condition for triggering the 51st message may be that a UE measurement report received by the DU2 carries the unknown PCI, or the message from the CU2 and received by the DU2 carries the unknown PCI.

Apparently, it should be understood by those skilled in the art that each of the above-mentioned modules or steps of the present application may be implemented by a general-purpose computing device, the modules or steps may be concentrated on a single computing device or distributed on a network composed of multiple computing devices, and optionally, the modules or steps may be implemented by program codes executable by the computing device, so that the modules or steps may be stored in a storage device and executed by the computing device. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any particular combination of hardware and software.

Although the embodiments disclosed by the present application are as described above, the content thereof is merely embodiments for facilitating the understanding of the present application and is not intended to limit the present application. Any person skilled in the art to which the present application pertains may make any modifications and variations in the implementation forms and details without departing from the spirit and scope disclosed by the present application, but the patent protection scope of the present application is still subject to the scope defined by the appended claims.

We claim:

1. A method, comprising:
transmitting, by a secondary node (SN) to a master node (MN), a first message that includes a physical cell identifier (PCI) of a cell, when a cell global identifier (CGI) of the cell associated with the PCI is not found in the SN, to cause the MN to acquire information on the cell within the MN by searching for the CGI associated with the PCI; and
receiving, by the SN from the MN, a second message that includes (i) the information on the cell and (ii) the PCI of the cell, wherein the information on the cell within the MN includes a cell identifier, a public land mobile network (PLMN) list corresponding to the cell, a band list, a tracking area code (TAC), a radio access network (RAN) area code (RANAC), and frequency information.

2. The method of claim 1, wherein the SN transmits the first message in response to receiving a measurement report of a user equipment (UE) that includes the PCI.

3. A method, comprising:
receiving, by a master node (MN) from a secondary node (SN), a first message that includes a physical cell identifier (PCI) of a cell, when a cell global identifier (CGI) of the cell associated with the PCI is not found in the SN;
acquiring, by the MN, responsive to the first message, information on the cell within the MN by searching for the CGI associated with the PCI; and
transmitting, by the MN to the SN, a second message that includes (i) information on the cell and (ii) the PCI of the cell, wherein the information on the cell within the MN includes a cell identifier, a public land mobile network (PLMN) list corresponding to the cell, a band list, a tracking area code (TAC), a radio access network (RAN) area code (RANAC), and frequency information.

4. The method of claim 3, wherein the first message is transmitted by the SN in response to the SN receiving a measurement report of a user equipment (UE) that includes the PCI.

5. A secondary node (SN) comprising:
one or more processors configured to implement steps of:
transmitting, to a master node (MN), a first message that includes a physical cell identifier (PCI) of a cell, when a cell global identifier (CGI) of the cell associated with the PCI is not found in the SN, to cause the MN to acquire information on the cell within the MN by searching for the CGI associated with the PCI; and receiving, from the MN, a second message that includes (i) information on the cell and (ii) the PCI of the cell, wherein the information on the cell within the MN includes a cell identifier, a public land mobile network (PLMN) list corresponding to the cell, a band list, a tracking area code (TAC), a radio access network (RAN) area code (RANAC), and frequency information.

6. The SN of claim 5, wherein the one or more processors are configured to initiate the transmitting of the first message in response to the SN receiving a measurement report of a user equipment (UE) that includes the PCI.

7. A master node (MN) comprising:
one or more processors configured to implement steps of:
receiving, from a secondary node (SN), a first message that includes a physical cell identifier (PCI) of a cell, when a cell global identifier (CGI) of the cell associated with the PCI is not found in the SN;

acquiring, responsive to the first message, information on the cell within the MN by searching for the CGI associated with the PCI; and transmitting, to the SN, a second message that includes (i) information on the cell and (ii) the PCI of the cell, wherein the information on the cell within the MN includes a cell identifier, a public land mobile network (PLMN) list corresponding to the cell, a band list, a tracking area code (TAC), a radio access network (RAN) area code (RANAC), and frequency information.

8. The MN of claim 7, wherein the first message is transmitted by the SN in response to the SN receiving a measurement report of a user equipment (UE) that includes the PCI.

* * * * *